United States Patent
Liu et al.

(10) Patent No.: US 11,611,886 B2
(45) Date of Patent: Mar. 21, 2023

(54) NARROWBAND COMMUNICATIONS IN UNLICENSED FREQUENCY BAND

(71) Applicant: QUALCOMM Incorporated, San Diego, CA (US)

(72) Inventors: Chih-Hao Liu, San Diego, CA (US); Yisheng Xue, San Diego, CA (US); Xiaoxia Zhang, San Diego, CA (US); Jing Sun, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 17/001,511

(22) Filed: Aug. 24, 2020

(65) Prior Publication Data

US 2021/0120429 A1    Apr. 22, 2021

Related U.S. Application Data

(60) Provisional application No. 62/923,475, filed on Oct. 18, 2019.

(51) Int. Cl.
*H04W 16/14* (2009.01)
*H04L 5/00* (2006.01)
(Continued)

(52) U.S. Cl.
CPC .......... *H04W 16/14* (2013.01); *H04L 5/0048* (2013.01); *H04W 72/042* (2013.01); *H04W 72/0453* (2013.01); *H04W 74/0808* (2013.01)

(58) Field of Classification Search
None
See application file for complete search history.

(56) References Cited

U.S. PATENT DOCUMENTS

| | | | |
|---|---|---|---|
| 9,860,678 B2 | 1/2018 | Oh | |
| 2014/0301351 A1* | 10/2014 | Gao | ...................... H04W 16/14 370/329 |

(Continued)

FOREIGN PATENT DOCUMENTS

| | | |
|---|---|---|
| WO | WO-2018106658 A1 | 6/2018 |
| WO | WO-2018144638 A1 | 8/2018 |

OTHER PUBLICATIONS

International Search Report and Written Opinion—PCT/US2020/047743—ISA/EPO—dated Aug. 26, 2021.

*Primary Examiner* — Bob A Phunkulh
(74) *Attorney, Agent, or Firm* — Arun Swain; Holland & Hart LLP

(57) ABSTRACT

This disclosure provides systems, methods and apparatus, including computer programs encoded on computer storage media, for narrowband communications using frequency hopping in an unlicensed frequency band. In some aspects, a base station (BS) and a user equipment (UE) may communicate with one another over a sequence of unique frequency sub-bands of a frequency hopping pattern. In some instances, the BS and the UE may switch from a current frequency sub-band to another frequency sub-band based on a number of unsuccessful attempts to gain access to the current frequency sub-band. In some other instances, the BS and the UE may communicate data using configured grant (CG) resources based on a number of unsuccessful attempts to gain access to the current frequency sub-band.

28 Claims, 14 Drawing Sheets

(51) Int. Cl.
    *H04W 72/0453*    (2023.01)
    *H04W 72/04*      (2023.01)
    *H04W 74/08*      (2009.01)

(56) References Cited

U.S. PATENT DOCUMENTS

| | | | |
|---|---|---|---|
| 2018/0106658 A1* | 4/2018 | Smirnov | G01F 1/68 |
| 2019/0007972 A1* | 1/2019 | Gou | H04L 47/27 |
| 2019/0296790 A1* | 9/2019 | Ye | H04L 1/0038 |
| 2020/0236555 A1* | 7/2020 | Tomeba | H04W 16/14 |
| 2021/0045076 A1* | 2/2021 | Tomeba | H04L 27/26 |
| 2021/0058206 A1* | 2/2021 | Ye | H04W 4/70 |
| 2021/0235496 A1* | 7/2021 | Park | H04L 5/0012 |
| 2021/0298079 A1* | 9/2021 | Tomeba | H04W 74/0808 |
| 2021/0314938 A1* | 10/2021 | Kim | H04L 27/26025 |
| 2021/0345406 A1* | 11/2021 | Myung | H04W 24/08 |
| 2021/0410184 A1* | 12/2021 | Talarico | H04L 5/005 |
| 2022/0159720 A1* | 5/2022 | Tao | H04L 1/0068 |

* cited by examiner

1300

1302

Indicate the COT obtained on the first frequency sub-band by transmitting one or more of system information channel occupancy time (SI–COT), a group-common physical downlink control channel (GC–PDCCH), or a common transmit preamble to the at least one UE.

Contend for channel access on the first frequency sub-band using an extended CCA procedure based on not gaining medium access using the CCA procedure.

1314

Obtain access to the first frequency sub-band based on the extended CCA procedure.

1316

Communicate the first data frame over the first frequency sub-band based on obtaining access to the first frequency sub-band.

Time the communication of the first data frame to align with a slot boundary associated with the first frequency sub-band.

Switch to another frequency sub-band of the sequence of unique frequency sub-bands after a number of unsuccessful extended CCA procedures.

Transmit remaining minimum system information (RMSI) on the first frequency sub-band.

*Figure 13E*

NARROWBAND COMMUNICATIONS IN UNLICENSED FREQUENCY BAND

CROSS-REFERENCE TO RELATED APPLICATIONS

This patent application claims priority to U.S. Provisional Patent Application No. 62/923,475 entitled "NARROWBAND COMMUNICATIONS IN UNLICENSED FREQUENCY BAND" and filed on Oct. 18, 2019, which is assigned to the assignee hereof. The disclosures of all prior applications are considered part of and are incorporated by reference in this patent application.

TECHNICAL FIELD

This disclosure relates generally to wireless communications, and more specifically to narrowband frequency hopping in unlicensed frequency bands.

DESCRIPTION OF THE RELATED TECHNOLOGY

Wireless communications systems are capable of supporting communications with multiple users by sharing portions of a system bandwidth using a multiple-access technology such as code division multiple access (CDMA) systems, time division multiple access (TDMA) systems, frequency division multiple access (TDMA) systems, and orthogonal frequency division multiple access (OFDMA) systems (such as a Long Term Evolution (LTE) system or a Fifth Generation (5G) New Radio (NR) system). A wireless multiple-access communications system may include a number of base stations or access network nodes, each simultaneously supporting communication for multiple communication devices, which may be otherwise known as user equipment (UE).

These multiple access technologies have been adopted in various telecommunication standards to provide a common protocol that enables different wireless devices to communicate on a municipal, national, regional, and even global level. An example telecommunication standard is 5G New Radio (NR). There exists a need for further improvements in 5G NR technology. These improvements also may be applicable to other multi-access technologies and the telecommunication standards that employ these technologies.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for wireless communication. The method may be performed by an apparatus of a user equipment (UE), and may include receiving a discovery reference signal (DRS) indicating a frequency hopping pattern including a sequence of unique frequency sub-bands, detecting a signal indicating a channel occupancy time (COT) on a first frequency sub-band of a sequence of unique frequency sub-bands, and communicating a first data frame of a series of data frames over the first frequency sub-band based on the detection of the signal.

In some implementations, the DRS may be received over an anchor channel of an unlicensed frequency band. In some instances, the DRS may include one or more clear channel assessment (CCA) parameters. In some other instances, the DRS also may include one or more of a primary synchronization signal (PSS), a secondary synchronization signal (SSS), a physical broadcast channel (PBCH), a system information block (SIB), a slot format indicator (SFI), or enhanced remaining minimum system information (eRMSI). The signal may include one or more of a system information channel occupancy time (SI-COT), a group-common physical downlink control channel (GC-PDCCH), or a common transmit preamble. In some instances, a duration of the COT obtained by a base station may be based on one of a CCA procedure or an extended CCA procedure performed by the base station to gain access to the first frequency sub-band.

The one or more CCA parameters may indicate one or more of an initial slot position associated with transmissions over at least the first frequency sub-band or a maximum number of extended CCA procedures to be performed when gaining access to the first frequency sub-band. In some instances, an initial slot position of the first data frame may be based on the number of CCA and extended CCA procedures performed to gain access to the first frequency sub-band. In some other instances, an initial slot position of the DRS may be based on the number of CCA and extended CCA procedures performed to gain access to a channel over which the DRS is transmitted (such as an anchor channel of an unlicensed frequency band). In some instances, each data frame of the series of data frames may be preceded by a corresponding DRS and communicated over a respective frequency sub-band of the sequence of unique frequency sub-bands.

In some implementations, the method also may include transmitting at least a portion of the series of data frames using configured grant (CG) resources based on not detecting the signal within a time period. In some other implementations, the method also may include switching to another frequency sub-band of the sequence of unique frequency sub-bands after a number of unsuccessful extended CCA procedures on the first frequency sub-band, or transmitting at least a portion of the series of data frames using configured grant (CG) resources after a number of unsuccessful extended CCA procedures on the first frequency sub-band.

In some implementations, a first symbol of the DRS may be punctured to facilitate a CCA procedure associated with transmission of the DRS, and a last symbol of the DRS may be punctured to facilitate a CCA procedure associated with transmission of the first data. In some other implementations, the method also may include at least one of puncturing a first symbol of the first data frame to facilitate a CCA procedure associated with transmission of the first data frame or puncturing a last symbol of the first data frame to facilitate a CCA procedure associated with transmission of a subsequent DRS from the base station.

Another innovative aspect of the subject matter described in this disclosure can be implemented in a wireless communication device. In some implementations, the wireless communication device may be a UE, and may include an interface and a processing system. The interface may be configured to obtain a DRS indicating a frequency hopping pattern including a sequence of unique frequency sub-bands. The processing system may be configured to detect a signal indicating a channel occupancy time (COT) on a first frequency sub-band of the sequence of unique frequency sub-bands. The interface also may be configured to output a first data frame of a series of data frames for transmission over the first frequency sub-band based on the detection of the signal.

In some implementations, the DRS may be received over an anchor channel of an unlicensed frequency band. In some instances, the DRS may include one or more CCA parameters. In some other instances, the DRS also may include one or more of a PSS, an SSS, a PBCH, an SIB, an SFI, or an eRMSI. The signal may include one or more of a SI-COT, a GC-PDCCH, or a common transmit preamble. In some instances, a duration of the COT obtained by a base station may be based on one of a CCA procedure or an extended CCA procedure performed by the base station to gain access to the first frequency sub-band.

The one or more CCA parameters may indicate one or more of an initial slot position associated with transmissions over at least the first frequency sub-band or a maximum number of extended CCA procedures to be performed when gaining access to the first frequency sub-band. In some instances, an initial slot position of the first data frame may be based on the number of CCA and extended CCA procedures performed to gain access to the first frequency sub-band. In some other instances, an initial slot position of the DRS may be based on the number of CCA and extended CCA procedures performed to gain access to a channel over which the DRS is transmitted (such as an anchor channel of an unlicensed frequency band). In some instances, each data frame of the series of data frames may be preceded by a corresponding DRS and communicated over a respective frequency sub-band of the sequence of unique frequency sub-bands.

In some implementations, the interface also may be configured to output at least a portion of the series of data frames for transmission using CG resources based on not detecting the signal within a time period. In some other implementations, the interface also may be configured to switch to another frequency sub-band of the sequence of unique frequency sub-bands after a number of unsuccessful extended CCA procedures on the first frequency sub-band, or to output at least a portion of the series of data frames for transmission using CG resources after a number of unsuccessful extended CCA procedures on the first frequency sub-band.

In some implementations, a first symbol of the DRS may be punctured to facilitate a CCA procedure associated with transmission of the DRS, and a last symbol of the DRS may be punctured to facilitate a CCA procedure associated with transmission of the first data frame. In some other implementations, the interface also may be configured to puncture at least one of a first symbol of the first data frame to facilitate a CCA procedure associated with transmission of the first data frame, and may be configured to puncture a last symbol of the first data frame to facilitate a CCA procedure associated with transmission of a subsequent DRS from the base station.

Another innovative aspect of the subject matter described in this disclosure can be implemented in a non-transitory computer-readable memory. The non-transitory computer-readable memory can store instructions that, when executed by one or more processors of a UE, cause the UE to perform a number of operations. In some implementations, the number of operations may include receiving a DRS indicating a frequency hopping pattern including a sequence of unique frequency sub-bands, detecting a signal indicating a channel occupancy time (COT) on a first frequency sub-band of the sequence of unique frequency sub-bands, and communicating a first data frame of a series of data frames over the first frequency sub-band based on the detection of the signal.

In some implementations, the DRS may be received over an anchor channel of an unlicensed frequency band. In some instances, the DRS may include one or more CCA parameters. In some other instances, the DRS also may include one or more of a PSS, an SSS, a PBCH, an SIB, an SFI, or an eRMSI. The signal may include one or more of a SI-COT, a GC-PDCCH, or a common transmit preamble. In some instances, a duration of the COT obtained by a base station may be based on one of a CCA procedure or an extended CCA procedure performed by the base station to gain access to the first frequency sub-band.

The one or more CCA parameters may indicate one or more of an initial slot position associated with transmissions over at least the first frequency sub-band or a maximum number of extended CCA procedures to be performed when gaining access to the first frequency sub-band. In some instances, an initial slot position of the first data frame may be based on the number of CCA and extended CCA procedures performed to gain access to the first frequency sub-band. In some other instances, an initial slot position of the DRS may be based on the number of CCA and extended CCA procedures performed to gain access to a channel over which the DRS is transmitted (such as an anchor channel of an unlicensed frequency band). In some instances, each data frame of the series of data frames may be preceded by a corresponding DRS and communicated over a respective frequency sub-band of the sequence of unique frequency sub-bands.

In some implementations, the number of operations also may include transmitting at least a portion of the series of data frames using CG resources based on not detecting the signal within a time period. In some other implementations, the number of operations also may include switching to another frequency sub-band of the sequence of unique frequency sub-bands after a number of unsuccessful extended CCA procedures on the first frequency sub-band, or transmitting at least a portion of the series of data frames using CG resources after a number of unsuccessful extended CCA procedures on the first frequency sub-band.

In some implementations, a first symbol of the DRS may be punctured to facilitate a CCA procedure associated with transmission of the DRS, and a last symbol of the DRS may be punctured to facilitate a CCA procedure associated with transmission of the first data frame. In some other implementations, the number of operations also may include at least one of puncturing a first symbol of the first data frame to facilitate a CCA procedure associated with transmission of the first data frame or puncturing a last symbol of the first data frame to facilitate a CCA procedure associated with transmission of a subsequent DRS from the base station.

Another innovative aspect of the subject matter described in this disclosure can be implemented as a method for wireless communication. The method may be performed by an apparatus of a base station, and may include transmitting a DRS to at least one UE, the DRS including one or more clear channel assessment CCA parameters and indicating a frequency hopping pattern including a sequence of unique frequency sub-bands, contending for channel access on a first frequency sub-band of the sequence of unique frequency sub-bands using a CCA procedure, obtaining access to the first frequency sub-band for a COT based on the contending, and communicating a first data frame of a series of data frames over the first frequency sub-band during the COT.

In some implementations, the DRS may be transmitted over an anchor channel of an unlicensed frequency band. In some instances, the DRS also may include one or more of a PSS, an SSS, a PBCH, an SIB, an SFI, or an eRMSI. The signal may include one or more of a SI-COT, a GC-PDCCH, or a common transmit preamble. In some instances, a duration of the COT obtained by the base station may be based on one of a CCA procedure or an extended CCA procedure performed by the base station to gain access to the first frequency sub-band.

The one or more CCA parameters may indicate one or more of an initial slot position associated with transmissions over at least the first frequency sub-band or a maximum number of extended CCA procedures to be performed when gaining access to the first frequency sub-band. In some instances, an initial slot position of the first data frame may be based on the number of CCA and extended CCA procedures performed to gain access to the first frequency sub-band. In some other instances, an initial slot position of the DRS may be based on the number of CCA and extended CCA procedures performed to gain access to a channel over which the DRS is transmitted (such as an anchor channel of an unlicensed frequency band). In some instances, each data frame of the series of data frames may be preceded by a corresponding DRS and communicated over a corresponding frequency sub-band of the sequence of unique frequency sub-bands.

In some implementations, the method also may include indicating the COT obtained on the first frequency sub-band by transmitting one or more of a SI-COT, a GC-PDCCH, or a common transmit preamble to the at least one UE. In some other implementations, the method also may include contending for channel access on the first frequency sub-band using an extended CCA procedure based on not gaining channel access using the CCA procedure, obtaining access to the first frequency sub-band based on the extended CCA procedure, and communicating the first data frame over the first frequency sub-band based on obtaining access to the first frequency sub-band. In some other implementations, the method also may include switching to another frequency sub-band of the sequence of unique frequency sub-bands after a number of unsuccessful extended CCA procedures.

In some implementations, the method also may include at least one of puncturing a first symbol of the first data frame to facilitate a CCA procedure associated with transmission of the first data frame or puncturing a last symbol of the first data frame to facilitate a CCA procedure associated with transmission of a subsequent DRS. In some other implementations, the method also may include at least one of puncturing a first symbol of the DRS to facilitate the CCA procedure associated with transmission of the DRS or puncturing a last symbol of the DRS to facilitate a CCA procedure associated with transmission of the first data frame.

Another innovative aspect of the subject matter described in this disclosure can be implemented in a wireless communication device. In some implementations, the wireless communication device may be a base station, and may include a memory, at least one network interface, and a processing system communicatively coupled to the memory and the at least one network interface. The processing system may be configured to transmit a DRS to at least one UE, the DRS including one or more CCA parameters and indicating a frequency hopping pattern including a sequence of unique frequency sub-bands, to contend for channel access on a first frequency sub-band of the sequence of unique frequency sub-bands using a CCA procedure, to obtain access to the first frequency sub-band for a COT based on the contending, and to communicate a first data frame of a series of data frames over the first frequency sub-band during the COT.

In some implementations, the DRS may be transmitted over an anchor channel of an unlicensed frequency band. In some instances, the DRS also may include one or more of a PSS, an SSS, a PBCH, an SIB, an SFI, or an eRMSI. The signal may include one or more of a SI-COT, a GC-PDCCH, or a common transmit preamble. In some instances, a duration of the COT obtained by the base station may be based on one of a CCA procedure or an extended CCA procedure performed by the base station to gain access to the first frequency sub-band.

The one or more CCA parameters may indicate one or more of an initial slot position associated with transmissions over at least the first frequency sub-band or a maximum number of extended CCA procedures to be performed when gaining access to the first frequency sub-band. In some instances, an initial slot position of the first data frame may be based on the number of CCA and extended CCA procedures performed to gain access to the first frequency sub-band. In some other instances, an initial slot position of the DRS may be based on the number of CCA and extended CCA procedures performed to gain access to a channel over which the DRS is transmitted (such as an anchor channel of an unlicensed frequency band). In some instances, each data frame of the series of data frames may be preceded by a corresponding DRS and communicated over a corresponding frequency sub-band of the sequence of unique frequency sub-bands.

In some implementations, the processing system also may be configured to indicate the COT obtained on the first frequency sub-band by transmitting one or more of a SI-COT, a GC-PDCCH, or a common transmit preamble to the at least one UE. In some other implementations, the processing system also may be configured to contend for channel access on the first frequency sub-band using an extended CCA procedure based on not gaining channel access using the CCA procedure, to obtain access to the first frequency sub-band based on the extended CCA procedure, and to communicate the first data frame over the first frequency sub-band based on obtaining access to the first frequency sub-band. In some other implementations, the processing system also may be configured to switch to another frequency sub-band of the sequence of unique frequency sub-bands after a number of unsuccessful extended CCA procedures.

In some implementations, the processing system also may be configured to puncture a first symbol of the first data frame to facilitate a CCA procedure associated with transmission of the first data frame, or to puncture a last symbol of the first data frame to facilitate a CCA procedure associated with transmission of a subsequent DRS. In some other implementations, the processing system also may be configured to puncture a first symbol of the DRS to facilitate the CCA procedure associated with transmission of the DRS, or to puncture a last symbol of the DRS to facilitate a CCA procedure associated with transmission of the first data frame.

Another innovative aspect of the subject matter described in this disclosure can be implemented in a non-transitory computer-readable memory. The non-transitory computer-readable memory can store instructions that, when executed by one or more processors of a base station, cause the base station to perform a number of operations. In some implementations, the number of operations may include transmitting a DRS to at least one UE, the DRS including one or more clear channel assessment CCA parameters and indicating a frequency hopping pattern including a sequence of unique frequency sub-bands, contending for channel access on a first frequency sub-band of the sequence of unique frequency sub-bands using a CCA procedure, obtaining access to the first frequency sub-band for a COT based on the contending, and communicating a first data frame of a series of data frames over the first frequency sub-band during the COT.

In some implementations, the DRS may be transmitted over an anchor channel of an unlicensed frequency band. In some instances, the DRS also may include one or more of a PSS, an SSS, a PBCH, an SIB, an SFI, or an eRMSI. The signal may include one or more of a SI-COT, a GC-PDCCH, or a common transmit preamble. In some instances, a duration of the COT obtained by the base station may be based on one of a CCA procedure or an extended CCA procedure performed by the base station to gain access to the first frequency sub-band.

The one or more CCA parameters may indicate one or more of an initial slot position associated with transmissions over at least the first frequency sub-band or a maximum number of extended CCA procedures to be performed when gaining access to the first frequency sub-band. In some instances, an initial slot position of the first data frame may be based on the number of CCA and extended CCA procedures performed to gain access to the first frequency sub-band. In some other instances, an initial slot position of the DRS may be based on the number of CCA and extended CCA procedures performed to gain access to a channel over which the DRS is transmitted (such as an anchor channel of an unlicensed frequency band). In some instances, each data frame of the series of data frames may be preceded by a corresponding DRS and communicated over a corresponding frequency sub-band of the sequence of unique frequency sub-bands.

In some implementations, the number of operations also may include indicating the COT obtained on the first frequency sub-band by transmitting one or more of a SI-COT, a GC-PDCCH, or a common transmit preamble to the at least one UE. In some other implementations, the number of operations also may include contending for channel access on the first frequency sub-band using an extended CCA procedure based on not gaining channel access using the CCA procedure, obtaining access to the first frequency sub-band based on the extended CCA procedure, and communicating the first data frame over the first frequency sub-band based on obtaining access to the first frequency sub-band. In some other implementations, the number of operations also may include switching to another frequency sub-band of the sequence of unique frequency sub-bands after a number of unsuccessful extended CCA procedures.

In some implementations, the number of operations also may include at least one of puncturing a first symbol of the first data frame to facilitate a CCA procedure associated with transmission of the first data frame or puncturing a last symbol of the first data frame to facilitate a CCA procedure associated with transmission of a subsequent DRS. In some other implementations, the number of operations also may include at least one of puncturing a first symbol of the DRS to facilitate the CCA procedure associated with transmission of the DRS or puncturing a last symbol of the DRS to facilitate a CCA procedure associated with transmission of the first data frame.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 13A shows a flowchart depicting an example operation for wireless communications that supports frequency hopping in narrowband communications.

FIG. 13B shows a flowchart depicting an example operation for wireless communications that supports frequency hopping in narrowband communications.

FIG. 13C shows a flowchart depicting an example operation for wireless communications that supports frequency hopping in narrowband communications.

FIG. 13D shows a flowchart depicting an example operation for wireless communications that supports frequency hopping in narrowband communications.

FIG. 13E shows a flowchart depicting an example operation for wireless communications that supports frequency hopping in narrowband communications.

Like reference numbers and designations in the various drawings indicate like elements.

DETAILED DESCRIPTION

Figure 1:
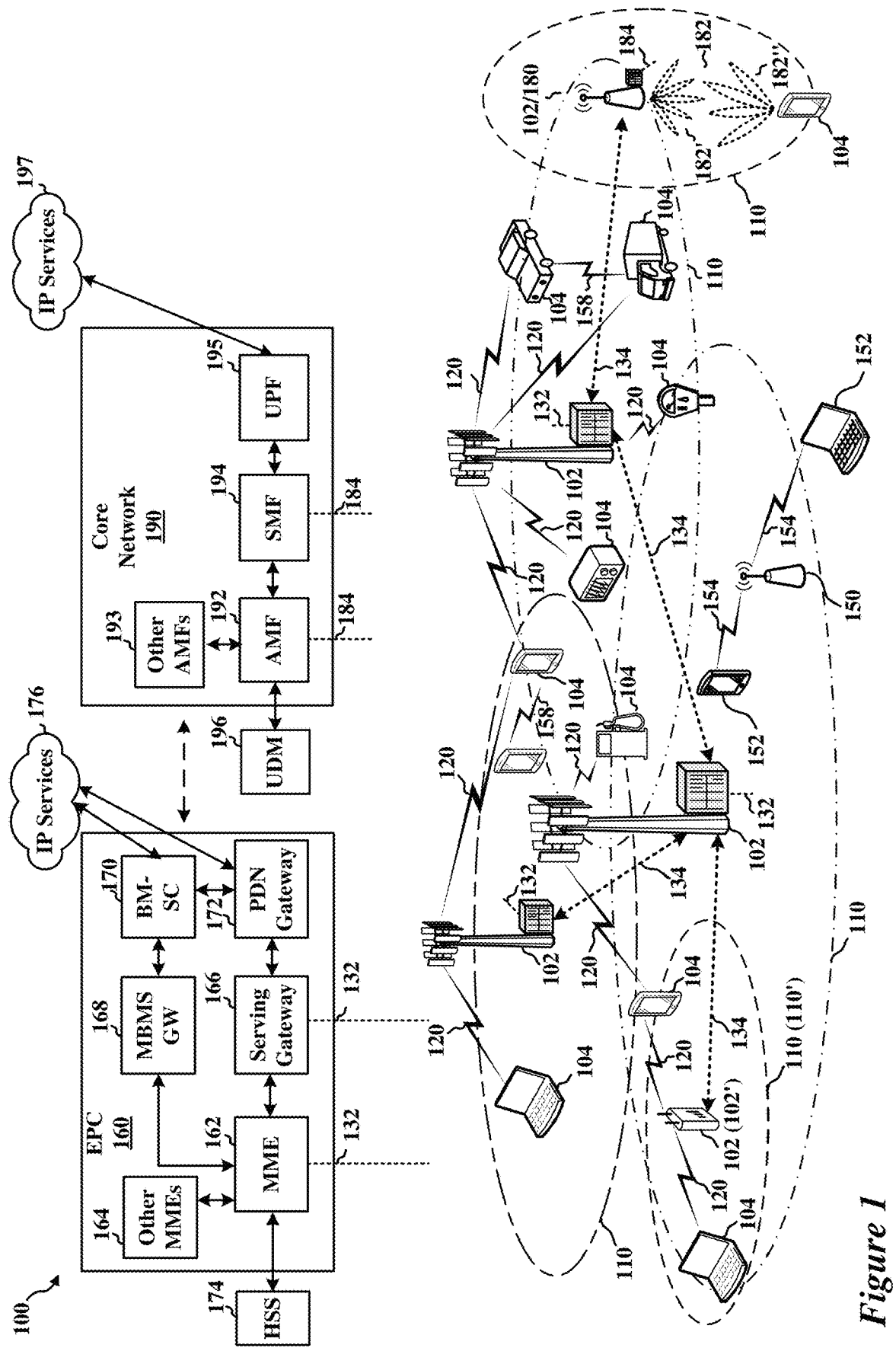
FIG. 1 shows a diagram illustrating an example wireless communications system and access network.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Implementations of the subject matter described in this disclosure may allow UEs and base stations operating according to 5G NR to exchange data and other information using narrowband communications with frequency hopping in one or more unlicensed frequency bands. In accordance with various aspects of the present disclosure, a base station may transmit a discovery reference signal (DRS) indicating a frequency hopping pattern that includes a sequence of unique frequency sub-bands over which the base station and a UE may communicate a series of data frames. After transmission of the DRS, the base station and the UE may move or jump to a first frequency sub-band of the frequency hopping pattern, and the base station may contend for channel access on the first frequency sub-band using a clear channel assessment (CCA) procedure (such as a one-shot CCA). When the base station obtains access to the first frequency sub-band for a channel occupancy time (COT), the base station may transmit an indication of the COT obtained on the first frequency sub-band. The UE may detect the COT indication signal, and the base station and the UE may begin communicating data over the first frequency sub-band during the COT.

If the UE does not detect the COT indication signal (such as because the base station did not obtain a COT on the first frequency sub-band and thus did not transmit the COT indication signal), then the UE may not transmit or receive data over the first frequency sub-band during the corresponding hopping period, thereby wasting power and an opportunity to transmit uplink (UL) data. As such, in some implementations, the UE may transmit one or more portions of queued UL data using configured grant (CG) resources when the UE does not detect or receive the COT indication signal within a time period. In this way, the UE may transmit at least some of its queued UL data during the corresponding hopping period, even when the first frequency sub-band is not available.

In some implementations, if the base station does not obtain channel access to the first frequency sub-band using the initial CCA procedure, the base station may continue contending for access to the first frequency sub-band using an enhanced CCA procedure until the base station obtains a COT on the first frequency sub-band, or until a maximum number of extended CCA procedures have been performed on the first frequency sub-band. In some implementations, the base station and the UE may switch to another frequency sub-band of the frequency hopping pattern after a number of unsuccessful extended CCA procedures are performed on the first frequency sub-band. In some other implementations, the UE may transmit at least some of its queued UL data using configured grant (CG) resources after a number of unsuccessful extended CCA procedures are performed on the first frequency sub-band.

Particular implementations of the subject matter described in this disclosure can be implemented to realize one or more of the following potential advantages. The ability of base stations and UEs to communicate with each other using narrowband communications in unlicensed frequency bands may improve channel access, as compared with communications that use wider channels, because there may be less contention on relatively small frequency bands (such as a LBT frequency sub-band) than on relatively large frequency bands (such as a primary channel in a radio access network). For example, while many wireless communication networks utilize channel widths of 20 MHz, 40 MHz, 80 MHz, 160 MHz, and 320 MHz, the frequency sub-bands of frequency hopping patterns disclosed herein may have channel widths as narrow as 5 MHz (or less). As such, wireless communication devices such as base stations and UEs may be more likely to gain channel access to the relatively narrow frequency sub-bands of the frequency hopping patterns disclosed herein than to the relatively wideband channels defined by a wireless communication network. And because unlicensed frequency bands may be more ubiquitous than licensed portions of the radio frequency (RF) spectrum, narrowband communications implemented in one or more unlicensed frequency bands may provide better coverage for wireless devices such as base stations and UEs than communications implemented solely on licensed portions of the RF spectrum. In some instances, employing frequency hopping techniques in narrowband communications on one or more unlicensed frequency bands also may reduce interference from other wireless communication devices by exploiting the frequency diversity of the unlicensed frequency bands.

In addition, limiting the number of unsuccessful extended CCA procedures that can be performed on a particular frequency sub-band of the frequency hopping pattern may reduce UE power consumption. For example, by limiting the number of unsuccessful extended CCA procedures on a particular frequency sub-band to a number M, a UE may need to monitor no more than M slots or mini-slots at the beginning of a hopping frame for DL COT signaling, rather than camping on the particular frequency sub-band and monitoring the wireless medium for a presence of the COT indicator during an entirety of an associated dwell time, thereby reducing power consumption of the UE. In some implementations, the UE may enter a power save mode (or a sleep mode) for a remainder of the dwell time if the DL COT signaling is not detected within a time period, thereby further reducing power consumption of the UE. Further, by allowing the UE to transmit UL data using CG resources after a number of unsuccessful extended CCA procedures are performed on the particular frequency sub-band, aspects of the present disclosure may ensure that the UE is afforded an opportunity to transmit queued UL data during times when narrowband communications on an unlicensed frequency band are not feasible.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram of an example wireless communications system 100. The wireless communications system 100 includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (such as the S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over backhaul links 134 (such as the X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5 MHz, 10 MHz, 15 MHz, 20 MHz, 100 MHz, 400 MHz, etc.) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as a macro base station), may include an eNB, gNodeB (gNB), or another type of base station. Some base stations, such as gNB 180, may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (such as between 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 also may transmit a beamformed signal to the base station 180 in one or more transmit directions. The base station 180 may receive the beamformed signal from the UE 104 in one or more receive directions. The base station 180 and UE 104 may perform beam training to determine the best receive and transmit directions for each of the base station 180 and UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting MBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The wireless communications system 100 may utilize both licensed and unlicensed radio frequency spectrum bands. For example, the wireless system 100 may employ LTE License Assisted Access (LTE-LAA), LTE Unlicensed (LTE U) radio access technology, or 5G NR technology in an unlicensed radio band (such as the 5 GHz Industrial, Scientific, and Medical (ISM) band or the 6 GHz UNII bands). When operating in unlicensed radio bands, wireless communication devices (such as the base stations 102 and UEs 104) may employ listen-before-talk (LBT) channel access mechanisms to ensure the channel is clear before transmitting data. In some instances, operations in unlicensed radio bands may be based on a carrier aggregation (CA) configuration in conjunction with component carriers (CCs) operating in a licensed band. Operations in unlicensed radio bands may include downlink transmissions, uplink transmissions, or both. Duplexing in unlicensed radio bands may be based on frequency division duplexing (FDD), time division duplexing (TDD) or a combination of both.

Figure 2:
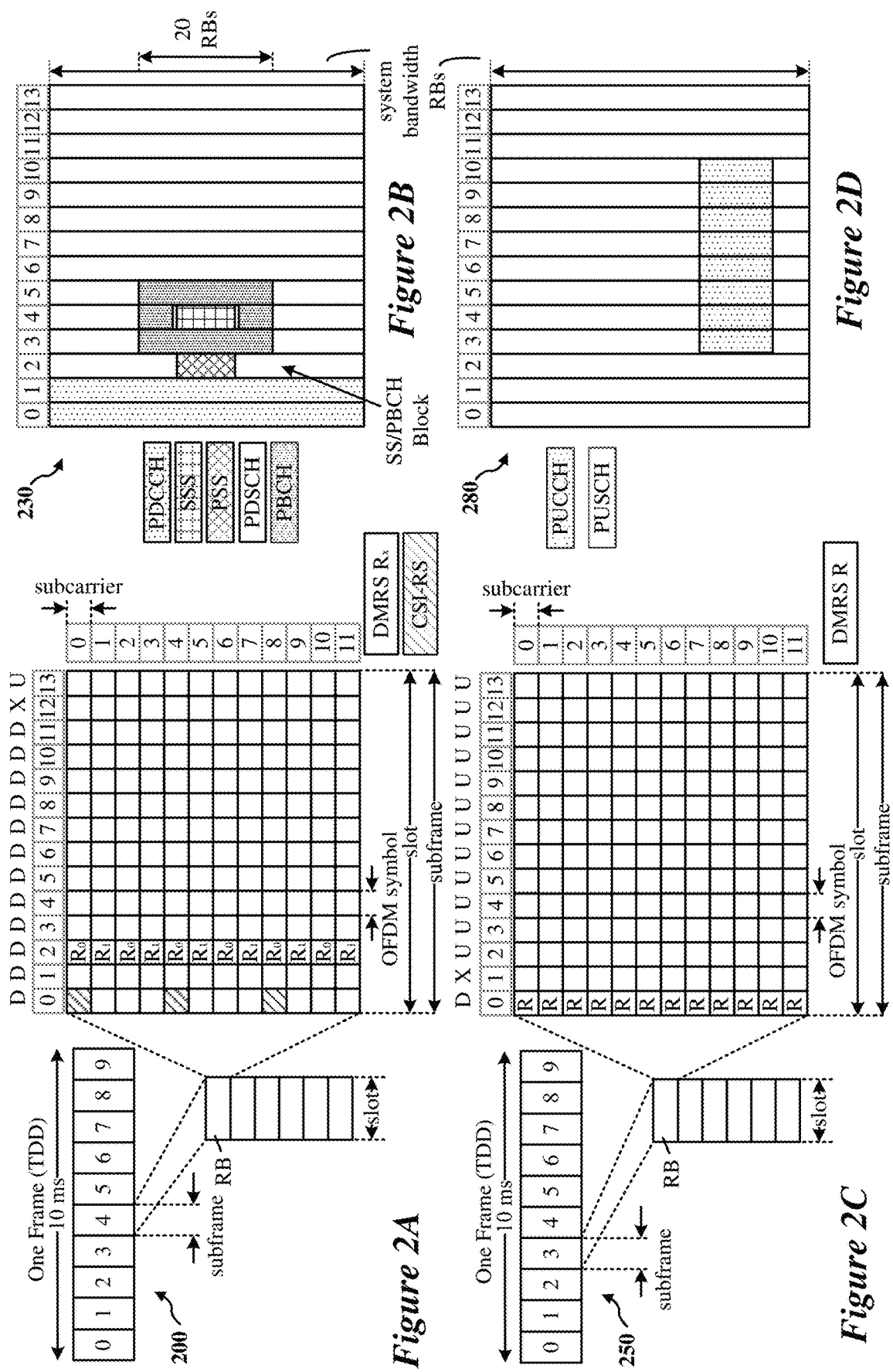
FIG. 2A shows an example of a first 5G NR frame.
FIG. 2B shows example downlink (DL) channels within a 5G NR slot.
FIG. 2C shows an example of a second 5G NR frame.
FIG. 2D shows example uplink (UL) channels within a 5G NR slot.

FIG. 2A shows an example of a first slot 200 within a 5G/NR frame structure. FIG. 2B shows an example of DL channels 230 within a 5G/NR slot. FIG. 2C shows an example of a second slot 250 within a 5G/NR frame structure. FIG. 2D shows an example of UL channels 280 within a 5G/NR slot. In some cases, the 5G/NR frame structure may be FDD in which, for a particular set of subcarriers (carrier system bandwidth), slots within the set of subcarriers are dedicated for either DL or UL transmissions. In other cases, the 5G/NR frame structure may be TDD in which, for a particular set of subcarriers (carrier system bandwidth), slots within the set of subcarriers are dedicated for both DL and UL transmissions. In the examples shown in FIGS. 2A and 2C, the 5G/NR frame structure is based on TDD, with slot 4 configured with slot format 28 (with mostly DL), where D indicates DL, U indicates UL, and X indicates that the slot is flexible for use between DL and UL, and with slot 3 configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs may be configured with the slot format, either dynamically through downlink control information (DCI) or semi-statically through radio resource control (RRC) signaling by a slot format indicator (SFI). The configured slot format also may apply to a 5G/NR frame structure that is based on FDD.

Other wireless communication technologies may have a different frame structure or different channels. A frame may be divided into a number of equally sized subframes. For example, a frame having a duration of 10 microseconds (μs) may be divided into 10 equally sized subframes each having a duration of 1 μs. Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (such as for high throughput scenarios) or discrete Fourier transform (DFT) spread OFDM (DFT-s-OFDM) symbols (also referred to as single carrier frequency-division multiple access (SC-FDMA) symbols) (such as for power limited scenarios).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols per slot and 2μ slots per subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz, and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 microseconds (μs).

A resource grid may be used to represent the frame structure. Each time slot includes a resource block (RB) (also referred to as a physical RB (PRB)) that extends across 12 consecutive subcarriers and across a number of symbols. The intersections of subcarriers and across 14 symbols. The intersections of subcarriers and of the RB define multiple resource elements (REs). The number of bits carried by each RE depends on the modulation scheme.

As illustrated in FIG. 2A, some of the REs carry a reference signal (RS) for the UE. In some configurations, one or more REs may carry a demodulation reference signal (DM-RS) (indicated as Rx for one particular configuration, where 100× is the port number, but other DM-RS configurations are possible). In some configurations, one or more REs may carry a channel state information reference signal (CSI-RS) for channel measurement at the UE. The REs also may include a beam measurement reference signal (BRS), a beam refinement reference signal (BRRS), and a phase tracking reference signal (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe or symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
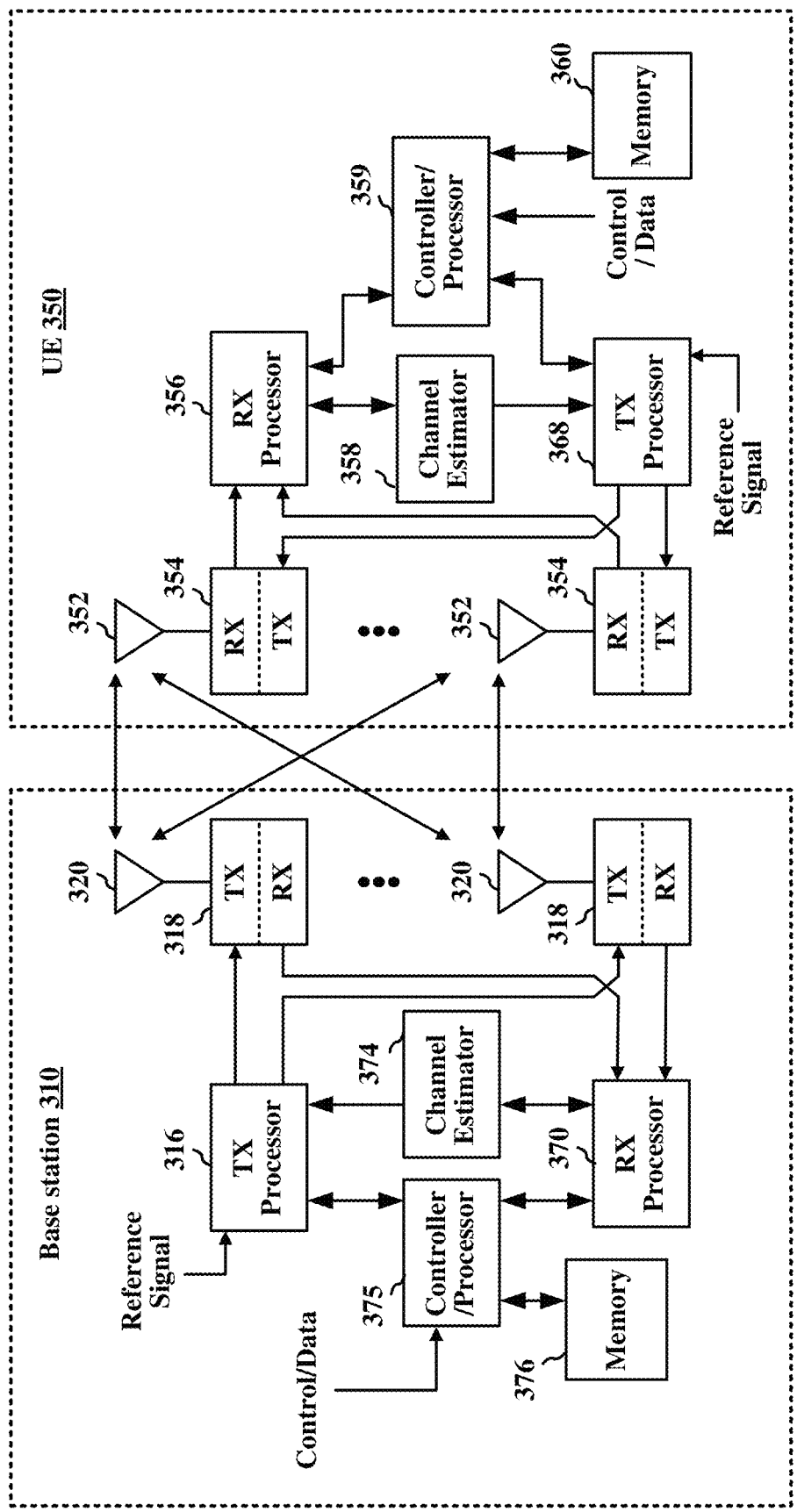
FIG. 3 shows a diagram illustrating an example base station and user equipment (UE) in an access network.

FIG. 3 shows a block diagram of an example base station 310 and UE 350 in an access network. In the DL, IP packets from the EPC 160 may be provided to a controller/processor 375 of the base station 310. The controller/processor 375 may implement layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 also may provide RRC layer functionality associated with broadcasting of system information (such as the MIB and SIBs), RRC connection control (such as RRC connection paging, RRC connection establishment, RRC connection modification, and RRC connection release), inter radio access technology (RAT) mobility, and measurement configuration for UE measurement reporting. The controller/processor 375 also may provide PDCP layer functionality associated with header compression/decompression, security (such as ciphering, deciphering, integrity protection, integrity verification), and handover support functions. The controller/processor 375 also may provide RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs. The controller/processor 375 also may provide MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

In some implementations, the controller/processor 375 may be a component of a processing system. A processing system may generally refer to a system or series of machines or components that receives inputs and processes the inputs to produce a set of outputs (which may be passed to other systems or components of, for example, the base station 310). For example, a processing system of the base station 310 may refer to a system including the various other components or subcomponents of the base station 310.

The processing system of the base station 310 may interface with other components of the base station 310, and may process information received from other components (such as inputs or signals), output information to other components, and the like. For example, a chip or modem of the base station 310 may include a processing system, a first interface to receive or obtain information, and a second interface to output, transmit or provide information. In some instances, the first interface may refer to an interface between the processing system of the chip or modem and a receiver, such that the base station 310 may receive information or signal inputs, and the information may be passed to the processing system. In some instances, the second interface may refer to an interface between the processing system of the chip or modem and a transmitter, such that the base station 310 may transmit information output from the chip or modem. A person having ordinary skill in the art will readily recognize that the second interface also may obtain or receive information or signal inputs, and the first interface also may output, transmit or provide information.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot signal) in the time or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 of the UE 350 provides RRC layer functionality associated with system information (such as the MIB and SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

In some implementations, the controller/processor 359 may be a component of a processing system. A processing system may generally refer to a system or series of machines or components that receives inputs and processes the inputs to produce a set of outputs (which may be passed to other systems or components of the UE 350). For example, a processing system of the UE 350 may refer to a system including the various other components or subcomponents of the UE 350.

The processing system of the UE 350 may interface with other components of the UE 350, and may process information received from other components (such as inputs or signals), output information to other components, and the like. For example, a chip or modem of the UE 350 may include a processing system, a first interface to receive or obtain information, and a second interface to output or transmit information. In some instances, the first interface may refer to an interface between the processing system of the chip or modem and a receiver, such that the UE 350 may receive information or signal inputs, and the information may be passed to the processing system. In some instances, the second interface may refer to an interface between the processing system of the chip or modem and a transmitter, such that the UE 350 may transmit information output from the chip or modem. A person having ordinary skill in the art will readily recognize that the second interface also may obtain or receive information or signal inputs, and the first interface also may output, transmit or provide information.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations. Information to be wirelessly communicated (such as for LTE or NR based communications) is encoded and mapped, at the PHY layer, to one or more wireless channels for transmission.

In the example of FIG. 3, each antenna 352 of the UE 350 is coupled to a respective transmitter 354TX. In some other implementations, some UEs may have fewer transmitters (or transmit chains) than receive (RX) antennas. Although not shown for simplicity, each transmitter may be coupled to a respective power amplifier (PA) which amplifies the signal to be transmitted. The combination of a transmitter with a PA may be referred to herein as a "transmit chain" or "TX chain." To save on cost or die area, the same PA may be reused to transmit signals over multiple RX antennas. In other words, one or more TX chains of a UE may be switchably coupled to multiple RX antennas ports.

Narrowband communications involve communicating with a limited frequency bandwidth (such as compared to wideband communications typically used by cellular and Wi-Fi devices), and may be implemented in an unlicensed frequency band. An unlicensed frequency band may refer to an RF band that is open for shared use by any device that complies with regulatory agency rules for communicating via the RF band. In some implementations, the unlicensed frequency band may include one or more radio frequencies in the 5 GHz band (such as the UNII frequency bands between approximately 5.15 GHz and approximately 5.825 GHz). In some other implementations, the unlicensed frequency band may include one or more radio frequencies in the 2.4 GHz band (such as radio frequencies between approximately 2.4 GHz and 2.48 GHz typically used by Wi-Fi devices and wireless networks). In some other implementations, the unlicensed frequency band may include one or more radio frequencies in the 6 GHz band.

In contrast to most licensed RF bands, users of unlicensed frequency bands do not typically have regulatory protection against radio interference from devices of other users, and may be subject to radio interference caused by other devices that use the unlicensed frequency band. Because the unlicensed frequency band may be shared by devices operating according to different communication protocols (such as the 3GPP standards for LTE and 5G NR devices and the IEEE 802.11 standards for Wi-Fi devices), a device operating in an unlicensed frequency band typically contends with other nearby devices for channel access before transmitting data on the unlicensed frequency band.

When communicating in an unlicensed frequency band, a UE or base station may need to coexist or share the unlicensed frequency band with other devices. One way to promote coexistence with other devices is to use a listen-before-talk or listen-before-transmit (LBT) procedure to determine that the shared wireless medium has been idle for a duration before attempting transmissions on the shared wireless medium. In some implementations, LBT procedures may be used with frequency hopping techniques to increase the likelihood of finding a clear channel for communication.

Figure 4:
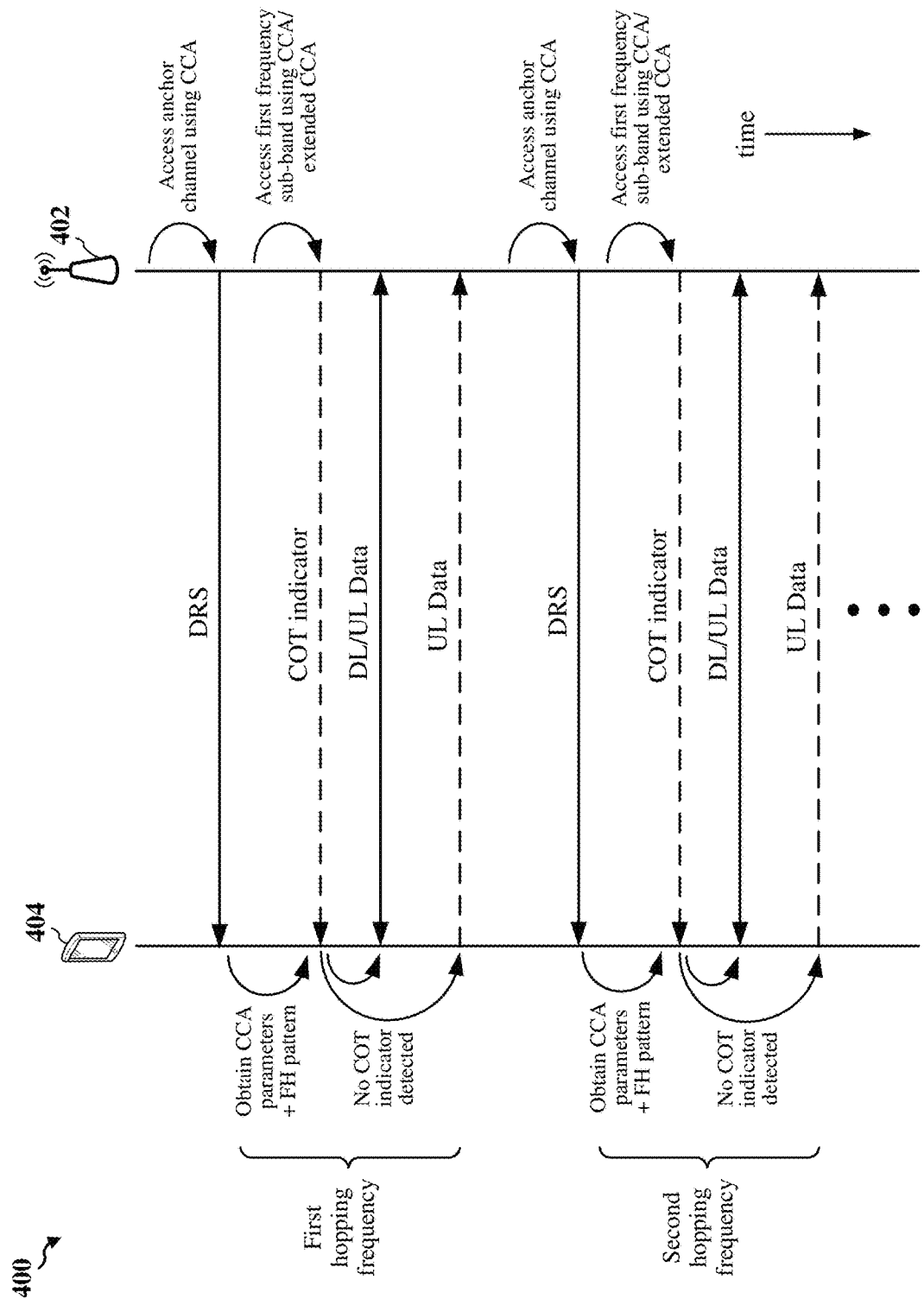
FIG. 4 shows a sequence diagram for wireless communication that supports frequency hopping between a base station and a UE.

FIG. 4 shows a sequence diagram depicting communications 400 between a base station 402 and a UE 404. The base station 402 may be one example of the base station 102 of FIG. 1 or the base station 310 of FIG. 3, the UE 404 may be one example of the UE 104 of FIG. 1 or the UE 350 of FIG. 3, and the radio access network may be any suitable RAN including, for example, a 5G NR access network. In some implementations, the communications 400 may be narrowband communications in an unlicensed frequency band. Although described herein with reference to unlicensed portions of the 2.4 GHz frequency band, the communications 400 may be performed on one or more other unlicensed frequency bands (such as one or more of the UNII bands in the 5 GHz frequency band, unlicensed portions of the 6 GHz frequency band, or other unlicensed frequency bands).

The base station 402 and UE 404 may use frequency hopping to exploit the frequency diversity in the unlicensed frequency band. The base station 402 may select or derive a frequency hopping pattern that includes a sequence of unique frequency sub-bands upon which the base station 402 and UE 404 may sequentially jump to transmit data to each other. The frequency sub-bands of the frequency hopping pattern also may be referred to as hopping frequencies or hopping channels. As such, in some implementations, the terms frequency sub-bands, hopping frequencies, and hopping channels may be interchangeable. The base station 402 also may select or determine frequency hopping parameters including one or more of a minimum number of hopping frequencies in the sequence, a dwell time on each of the hopping frequencies, and an accumulated dwell time.

In some instances, the base station 402 may select or dynamically adjust the frequency hopping patterns based on its geographic location, for example, so that the base station 402 and UE 404 comply with power spectral density (PSD) limits for frequency hopping devices imposed by a regulatory authority or government agency. For one example, Japan considers a wireless device to be a frequency hopping device in the 2.4 GHz frequency band if the wireless device hops over 15 or more channels and has a dwell time in each of the channels that is less than 400 milliseconds (ms). For another example, Europe considers a wireless device to be a frequency hopping device in the 2.4 GHz frequency band if the wireless device hops over 15 or more channels and the accumulated dwell time in each channel is less than 15 ms over the frequency hopping duration.

The base station 402 may transmit a discovery reference signal (DRS) to the UE 404 on an anchor channel. In some instances, the anchor channel can be an unlicensed channel (such as an anchor channel of an unlicensed radio band). In some other instances, the anchor channel can be a licensed channel (such as an anchor channel of a 5G RAN). The DRS may include the frequency hopping pattern, one or more frequency hopping parameters, and system information. The frequency hopping pattern may indicate a location of each frequency sub-band of the sequence of unique frequency sub-bands of the frequency hopping pattern, an order in which the UE 404 is to hop between the sequence of frequency sub-bands, and the dwell time on each frequency sub-band. The frequency hopping parameters may include a duration of a hopping frame, a duration of DRS transmissions in each hopping frame, a duration of DL and UL transmissions, a channel offset between each of the frequency sub-bands of the frequency hopping pattern, and other information. The system information may include one or more of a primary synchronization signal (PSS), a secondary synchronization signal (SSS), a physical broadcast channel (PBCH), a system information block (SIB), or a slot format indicator (SFI).

In some implementations, the base station 402 may use one or more clear channel assessment (CCA) procedures to access the anchor channel. The base station 402 may indicate one or more CCA parameters to the UE 404, for example, in the DRS. The one or more CCA parameters may include information such as the initial slot position of each frequency sub-band of the frequency hopping pattern, a maximum number of extended CCA procedures that can be used for channel access on a particular frequency sub-band, an indication for the UE 404 to jump to a next frequency sub-band after a number of unsuccessful extended CCA procedures are performed on the particular frequency sub-band, and an indication for the UE 404 to use configured granted (CG) resources for UL transmissions after a number of unsuccessful extended CCA procedures are performed on the particular frequency sub-band.

The UE 404 may receive the DRS, which may signal or trigger the communication of a data frame on the first frequency sub-band or hopping frequency. The UE 404 may determine or derive the frequency hopping pattern, the order of frequency hopping channels, and other frequency hopping information from the DRS. The UE 404 may use the PSS and SSS for cell search and acquisition, and may receive some system information (such as system information transmitted on the PDSCH) from the PBCH. In some implementations, the UE 404 may obtain the frequency hopping pattern from the SIBs contained in the DRS.

After transmission and reception of the DRS, the base station 402 and the UE 404 may jump to the first frequency sub-band to exchange data with each other. The base station 402 may contend for channel access on the first frequency sub-band using the CCA procedure, and may obtain access to the first frequency sub-band for a channel occupancy time (COT) based on winning the contention operation. In some implementations, the base station 402 may transmit a signal indicating the COT obtained on the first frequency sub-band. The signal may be one or more of system information channel occupancy time (SI-COT), a group-common physical downlink control channel (GC-PDCCH), or a common transmit preamble.

The UE 404 may monitor the first frequency sub-band to detect the COT indicator signal. If the UE 404 detects the COT indicator signal, the UE 404 may remain on the first frequency sub-band and communicate a first data frame of a series of data frames with the base station 402 during the COT. In some instances, the first data frame may be used to transmit DL data from the base station 402 to the UE 404 over the first frequency sub-band. In other instances, the first data frame may be used to transmit UL data from the UE 404 to the base station 402 over the first frequency sub-band. In some other instances, the first data frame may be used for both DL and UL data transmissions over the first frequency sub-band.

The base station 402 and the UE 404 may return to the anchor channel for the transmission of a second DRS associated with communicating a second data frame of the series of data frames on the second frequency sub-band of the frequency hopping pattern. The base station 402 and the UE 404 may perform the above-described operations for each of the frequency sub-bands in the sequence, for example, to communicate each data frame of the series of data frames on a corresponding one of the frequency sub-bands of the frequency hopping pattern.

If the UE 404 does not detect the COT indicator signal within a time period after transmission of the DRS, the UE 404 (and the base station 402) may jump to a next frequency sub-band in the frequency hopping pattern. In some implementations, the UE 404 may transmit UL data to the base station 402 using configured grant (CG) resources if the COT indicator signal is not detected within the time period.

In some implementations, the base station 402 may contend for access to a particular frequency sub-band using an extended CCA procedure after failing to gain channel access to the particular frequency sub-band using the CCA procedure. As used herein, the CCA procedure may be a one-shot listen-before-talk (LBT) channel access mechanism in which the base station 402 may obtain channel access if no signals are detected within a certain time (such as 18 μs), and the extended CCA procedure may be a category-2 LBT channel access mechanism in which the base station 402 uses CCA with random back-off to contend for channel access.

Figure 5:
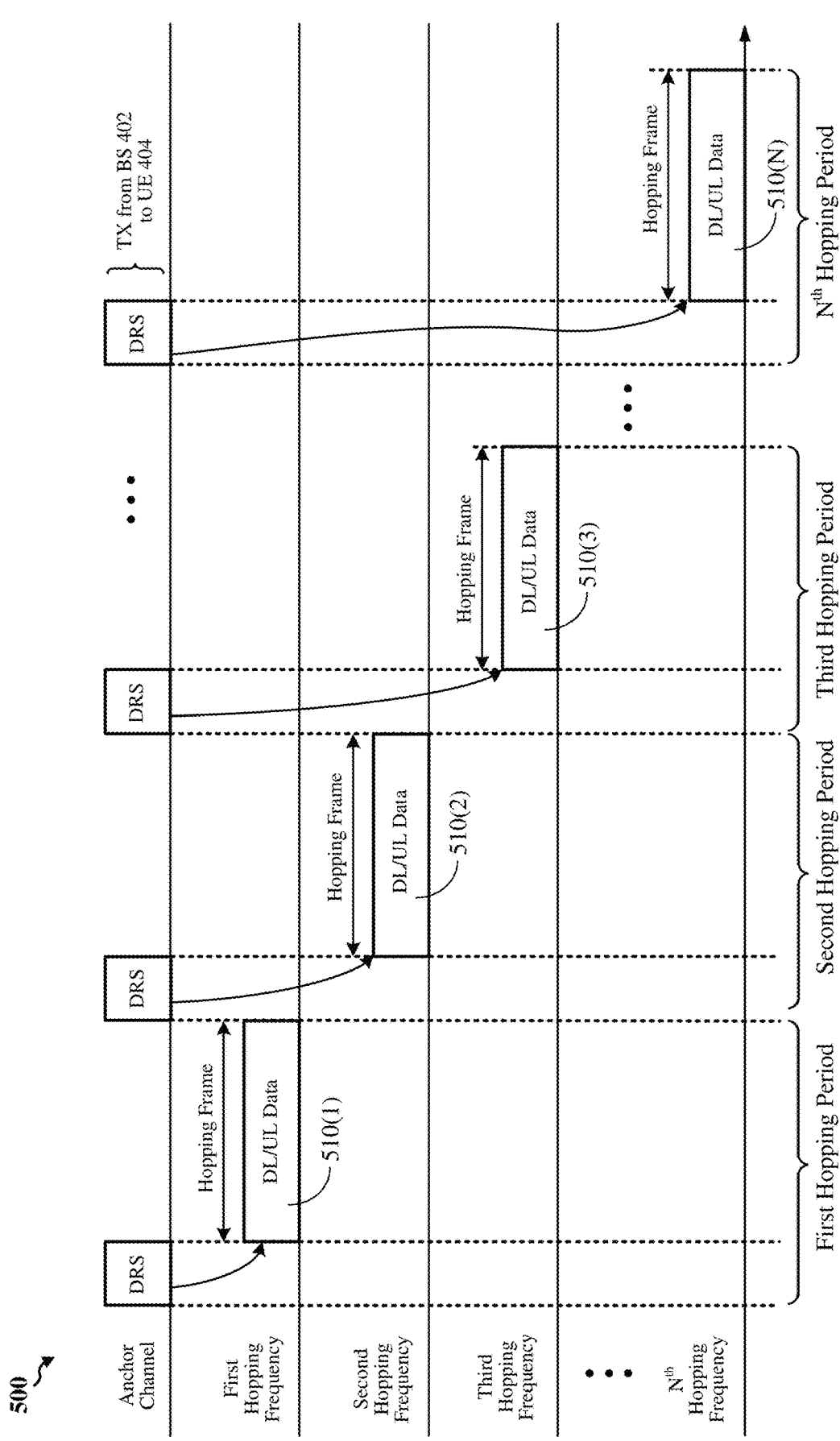
FIG. 5 shows an example frequency hopping pattern that may be used for narrowband communications between a base station and a UE.

FIG. 5 shows an example frequency hopping pattern 500 that may be used for narrowband communications between the base station 402 and the UE 404. In some implementations, the frequency hopping pattern 500 may be based at least in part on a cell ID and a slot index. The frequency hopping pattern 500 may include any suitable number (N) of unique frequency sub-bands or hopping frequencies in a sequence over which the base station 402 and the UE 404 may communicate a series of data frames, with each data frame in the series of data frames communicated on a corresponding one of the unique frequency sub-bands. In some implementations, the frequency hopping pattern 500 may include N=15 different frequency sub-bands or hopping frequencies. In some other implementations, the frequency hopping pattern 500 may include more than 15 different frequency sub-bands or hopping frequencies. In some aspects for which a base station and a UE exchange data using narrowband communications, the anchor channel may have a bandwidth of less than approximately 5 MHz, and each of the unique frequency sub-bands may have a bandwidth not greater than approximately 5 MHz.

The base station 402 transmits the DRS at the beginning of each of the N different frequency hops of the frequency hopping pattern 500 such that data communicated on each of the N frequency sub-bands is preceded by a corresponding DRS. For example, a base station may transmit a first DRS to signal communication of data on the first hopping frequency, jump to the first hopping frequency, and communicate a first data frame with the UE on the first hopping frequency. The base station may transmit a second DRS to signal communication of data on the second hopping frequency, jump to the second hopping frequency, and communicate a second data frame with the UE on the second hopping frequency. The base station may transmit a third DRS to signal communication of data on the third hopping frequency, jump to the third hopping frequency, communicate a third data frame with the UE on the third hopping frequency, and so on, until the base station and the UE have sequenced through the N different hopping frequencies.

In some implementations, each of the data frames in the series of data frames may be communicated using a corresponding one of a number N of hopping frames 510(1)-510(N). Each of the hopping frames 510(1)-510(N) may follow transmission of a corresponding DRS (such as on the anchor channel), and may carry DL data, UL data, or both DL and UL data.

Figure 6:
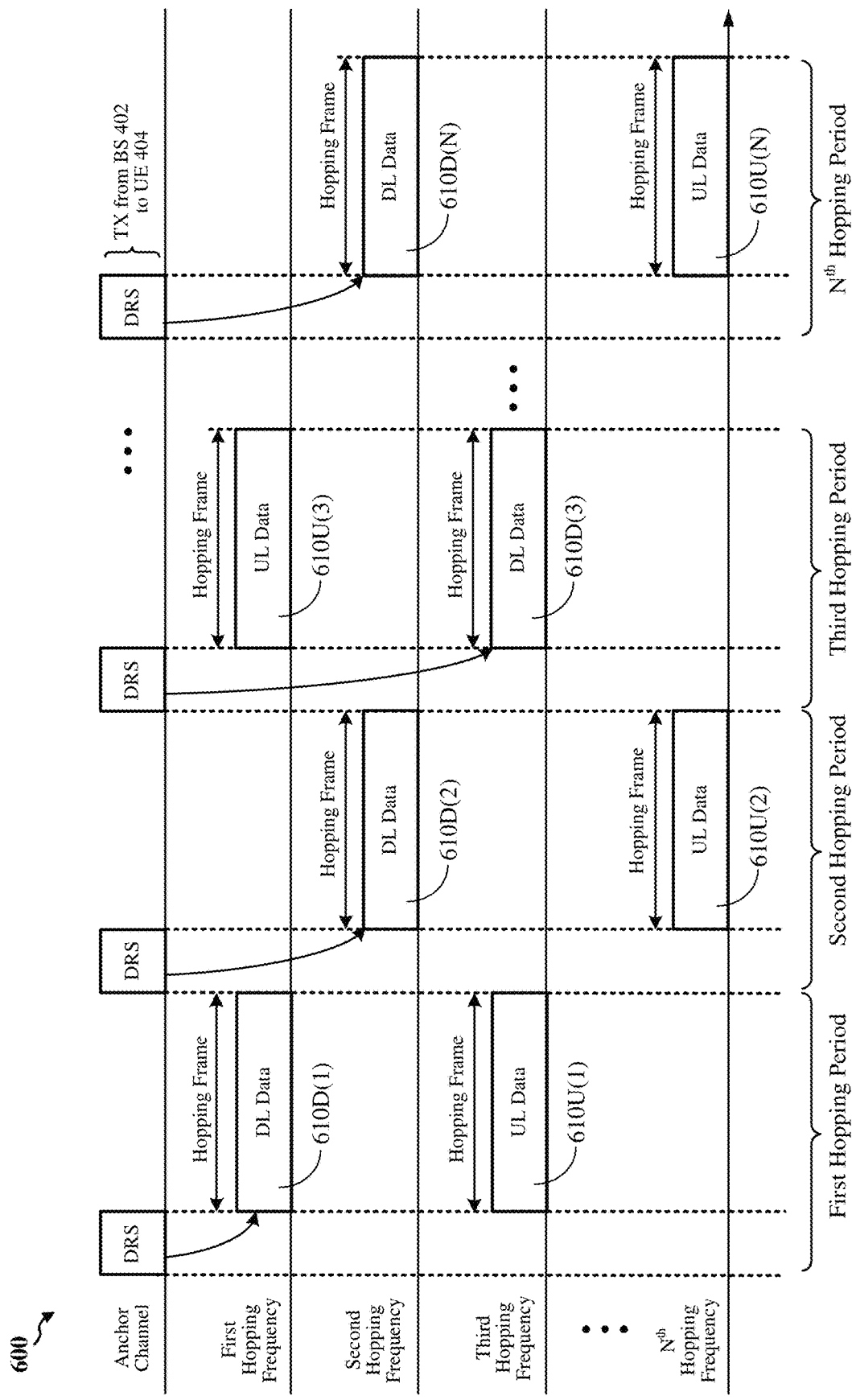
FIG. 6 shows an example frequency hopping pattern that may be used for narrowband communications between a base station and a UE.

FIG. 6 shows an example frequency hopping pattern 600 that may be used for narrowband communications between the base station 402 and the UE 404. The frequency hopping pattern 600 includes a sequence of N unique frequency sub-bands or hopping frequencies over which the base station 402 and the UE 404 may communicate a series of data frames, with each data frame in the series of data frames communicated over a corresponding one of the unique frequency sub-bands. In some implementations, the frequency hopping pattern 600 may be based at least in part on a cell ID and a slot index. In some implementations, the frequency hopping pattern 600 may include N=15 different frequency sub-bands or hopping frequencies. In some other implementations, the frequency hopping pattern 600 may include more than 15 different frequency sub-bands or hopping frequencies. In some aspects for which a base station and a UE exchange data using narrowband communications, the anchor channel may have a bandwidth of less than approximately 5 MHz, and each of the unique frequency sub-bands may have a bandwidth not greater than approximately 5 MHz.

The base station 402 transmits the DRS on the anchor channel prior to the communication of hopping frames on each of the N different frequency sub-bands or hopping frequencies of the frequency hopping pattern 600. The communication of data frames between the base station 402 and the UE 404 in the example of FIG. 6 is similar to the communication of data frames between the base station 402 and the UE 404 in the example of FIG. 5, except that the frequency hopping pattern 600 employs frequency division duplex (FDD) to allow for concurrent DL and UL transmissions during each frequency hop (such as on each of the unique frequency sub-bands). In some implementations, the frequency hopping pattern 600 may include a first sequence of hopping frequencies for DL transmissions, and may include a second sequence of hopping frequencies, different than the first sequence of hopping frequencies, for UL transmissions. In some aspects, the first and second sequences of hopping frequencies may be selected in a manner that maintains a minimum FDD frequency band gap between concurrent DL and UL transmissions. In some other implementations, the DL and UL transmissions may use the same sequence of hopping frequencies, offset from one another by a constant modulo. For example, if c_DL (n) denotes the hopping frequency for DL transmissions at time instance n, then the hopping frequency for UL transmissions may be chosen to be c_UL (n)=(c_DL (n)+A) mod N.

During the first hopping period, the base station 402 may transmit DL data in hopping frame 610D(1) over the first hopping frequency, and the UE 404 may transmit UL data in hopping frame 610U(1) over the third hopping frequency. During the second hopping period, the base station 402 may transmit DL data in hopping frame 610D(2) over the second hopping frequency, and the UE 404 may transmit UL data in hopping frame 610U(2) over the $N^{th}$ hopping frequency. During the third hopping period, the base station 402 may transmit DL data in hopping frame 610D(3) over the third hopping frequency, and the UE 404 may transmit UL data in hopping frame 610U(3) over the first hopping frequency. During the $N^{th}$ hopping period, the base station 402 may transmit DL data in hopping frame 610D(N) over the second hopping frequency, and the UE 404 may transmit UL data in hopping frame 610U(N) over the $N^{th}$ hopping frequency.

Figure 7:
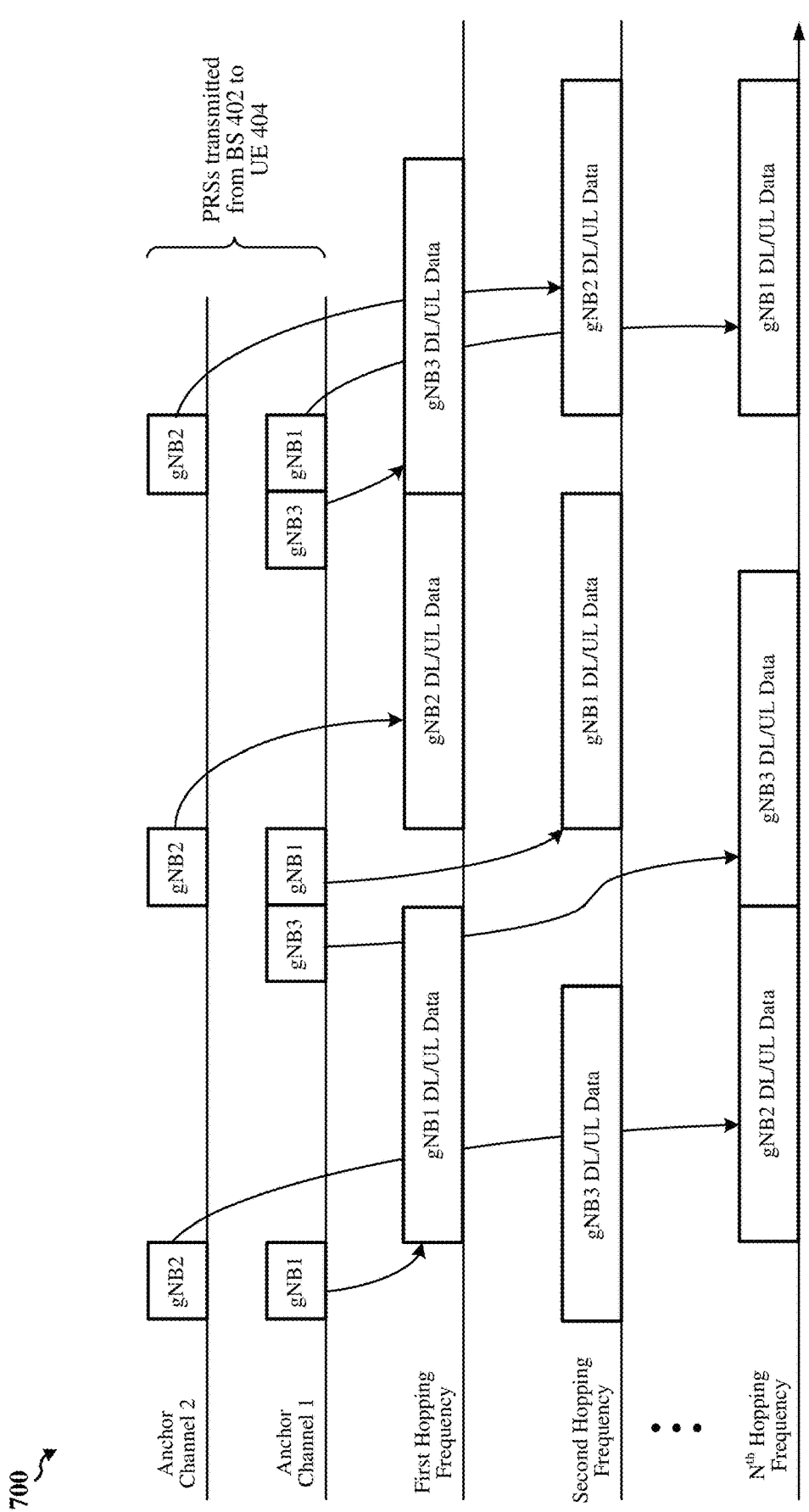
FIG. 7 shows an example frequency hopping pattern that may be used for narrowband communications between a base station and a UE.

FIG. 7 shows an example frequency hopping pattern 700 that may be used for narrowband communications between the base station 402 and the UE 404. The frequency hopping pattern 700 may include any suitable number (N) of unique frequency sub-bands or hopping frequencies in a sequence. In some implementations, the frequency hopping pattern 700 may include N=15 different frequency sub-bands or hopping frequencies. In some other implementations, the frequency hopping pattern 700 may include more than 15 different frequency sub-bands or hopping frequencies. In some aspects for which a base station and a UE exchange data using narrowband communications, the anchor channel may have a bandwidth of less than approximately 5 MHz, and each of the unique frequency sub-bands may have a bandwidth not greater than approximately 5 MHz.

In some implementations, the frequency hopping pattern 700 may include a plurality of different anchor channels that may be assigned to different base stations. For the example of FIG. 7, a first base station (gNB1) may be assigned to the first anchor channel, and each of a second base station (gNB2) and a third base station (gNB3) may be assigned to the second anchor channel. In addition, the frequency hopping pattern 700 may include an offset between each DRS and the hopping frames that follow, and may include offsets for burst transmissions such that the DL and UL transmissions associated with multiple base stations may time-division multiplexed (TDM), for example, as depicted in FIG. 7.

Figure 8A:
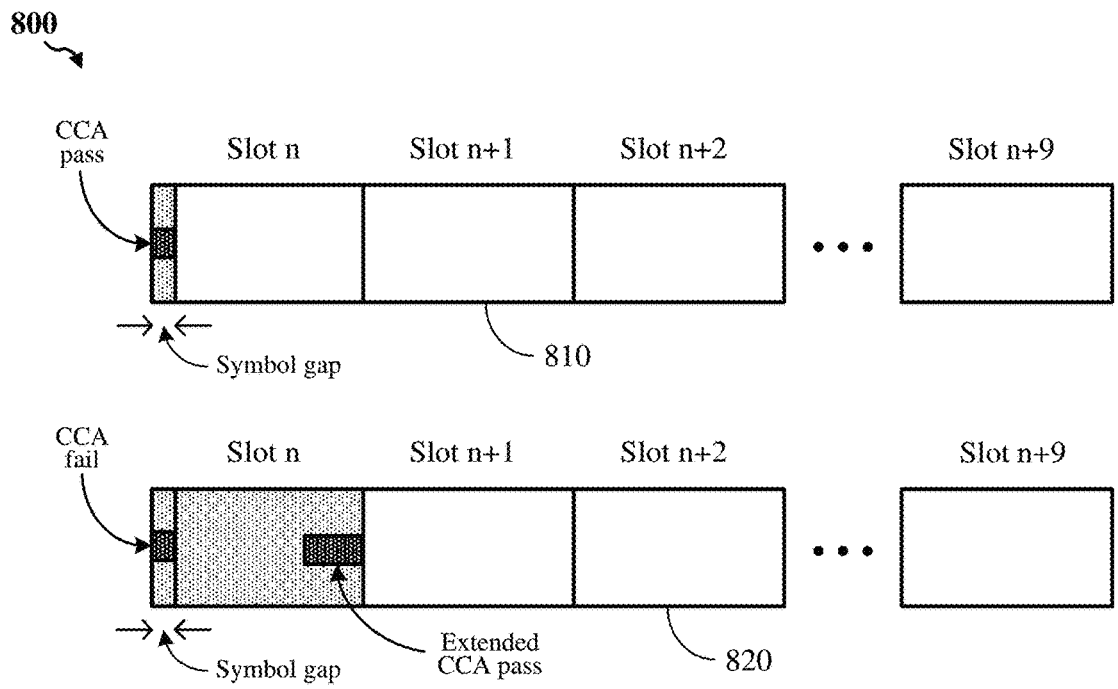
FIG. 8A shows a diagram illustrating initial slot positions in hopping frames transmitted on frequency sub-bands accessed using clear channel assessment (CCA) procedures.

FIG. 8A shows a diagram 800 illustrating initial slot positions in hopping frames transmitted on frequency sub-bands accessed using clear channel assessment (CCA) procedures. As described, a base station may contend for channel access on a given frequency sub-band of a frequency hopping pattern in an unlicensed frequency band using CCA (such as a one-shot CCA having a listening time of 18 μs). If the base station wins the contention operation and obtains a COT on the given frequency sub-band, the base station may begin communicating data with one or more UE over the given frequency sub-band during the COT.

Contending for channel access using CCA with a fixed listening period (such as 18 μs) may result in the base station obtaining a COT that begins after the initial slot position of the hopping frame 810, as indicated by the symbol gap in the hopping frame 810. In some implementations, the base station may defer the first CCA to the starting slot position of the hopping frame 810, for example, to temporally align communication of data on the given frequency sub-band with a starting slot position of the hopping frame 810. In some aspects, the base station may perform multiple DL transmissions during the COT based on gaining access to the given frequency sub-band using CCA. In some other implementations, the base station may be configured to perform CCA (such as a one-shot CCA with a fixed listening period) based on a gap between successive DL transmissions being greater than a value or based on a gap between adjacent UL and DL transmissions being greater than the value. In some aspects, the value may be 16 μs, for example, as provided by one or more of the 3GPP specifications.

If the initial CCA procedure fails, the base station may continue contending for access to the given frequency sub-band using an extended CCA procedure until the base station obtains a COT on the given frequency sub-band, or until a maximum number of extended CCA procedures have been performed (such as indicated by the one or more CCA parameters transmitted in each DRS). Because extended CCA channel access mechanisms use a random back-off in which the base station randomly selects a number within a contention window of a fixed size, each unsuccessful extended CCA procedure may cause an additional misalignment between the obtained COT and the slot boundaries of a hopping frame. For example, hopping frame 820 depicts a failure of the initial CCA performed by the base station, followed by a successful channel access operation using extended CCA. The random back-off associated with the extended CCA procedure may result in the base station obtaining access to the given frequency sub-band at a time corresponding to a boundary between slot n and slot n+1 of the hopping frame 820 (rather than at a time corresponding to a starting slot position of the hopping frame 820). As such, in some implementations, the base station (and the UE) may switch to another frequency sub-band of the frequency hopping pattern after a number of unsuccessful extended CCA procedures.

In some other implementations, the base station may puncture a last symbol of the DRS to facilitate the CCA procedure for gaining access to the first frequency sub-band, or may puncture a last symbol of the first data frame to facilitate the CCA procedure associated with transmission of a subsequent DRS. In addition, or in the alternative, the base station may puncture a first symbol of the DRS to facilitate the CCA procedure associated with transmission of the DRS, or may puncture a first symbol of the first data frame to facilitate the CCA procedure associated with transmission of the first data frame.

Figure 8B:
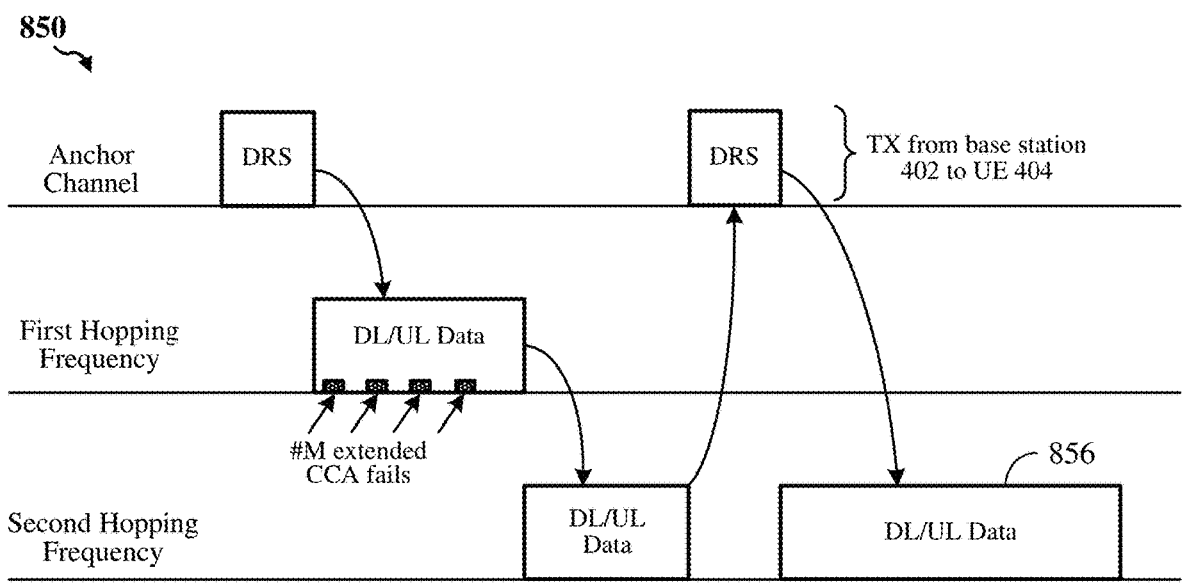
FIG. 8B shows a diagram depicting a device jumping from a current hopping frequency to another hopping frequency based on a number of unsuccessful channel access attempts using an extended CCA procedure.

FIG. 8B shows a diagram 850 depicting a switch from a current hopping frequency to another hopping frequency based on a number of unsuccessful extended CCA procedures performed on the current hopping frequency. The hopping frequency switch may be performed by a base station (such as the base station 102 of FIG. 1, the base station 310 of FIG. 3, or the base station 402 of FIG. 4), a UE (such as the UE 104 of FIG. 1, the UE 350 of FIG. 3, or the UE 404 of FIG. 4), or both. As described, a base station may initially contend for channel access on a given frequency sub-band of a frequency hopping pattern in an unlicensed frequency band using a CCA procedure. If the CCA procedure is unsuccessful, the base station may continue contending for access to the given frequency sub-band using an extended CCA procedure until the base station obtains a COT on the given frequency sub-band, or until a maximum number of extended CCA procedures have been performed.

For example, the diagram 850 depicts a number (M) of unsuccessful extended CCA procedures performed to gain access to the first hopping frequency, where M is an integer greater than one. Each of the unsuccessful extended CCA procedures may result in an additional misalignment between the obtained COT and the slot positions or boundaries of hopping frame 856, which may reduce data throughput and needlessly drain the limited power of a UE. As such, in some implementations, the base station and the UE may switch from the first hopping frequency to the second hopping frequency (without performing any data transmissions on the first hopping frequency) after a number of unsuccessful extended CCA procedures are performed on the first hopping frequency. The number may be selected by any suitable device, controller, or entity associated with the RAN.

In some instances, limiting the number of unsuccessful extended CCA procedures that can be performed on a given frequency sub-band of a frequency hopping pattern may reduce UE power consumption associated with monitoring the given frequency sub-band. For example, by limiting the number of unsuccessful extended CCA procedures to a number M, a UE may need to monitor no more than M slots or mini-slots at the beginning of a hopping frame for DL COT signaling. In some implementations, if the UE does not detect the DL COT signaling within a corresponding time period, the UE may enter a power save mode (or a sleep mode) for the remainder of the dwell time, thereby conserving power. In some other implementations, the UE may transmit UL data using configured grant (CG) resources if the DL COT signaling is detected within the corresponding time period.

Figure 9:
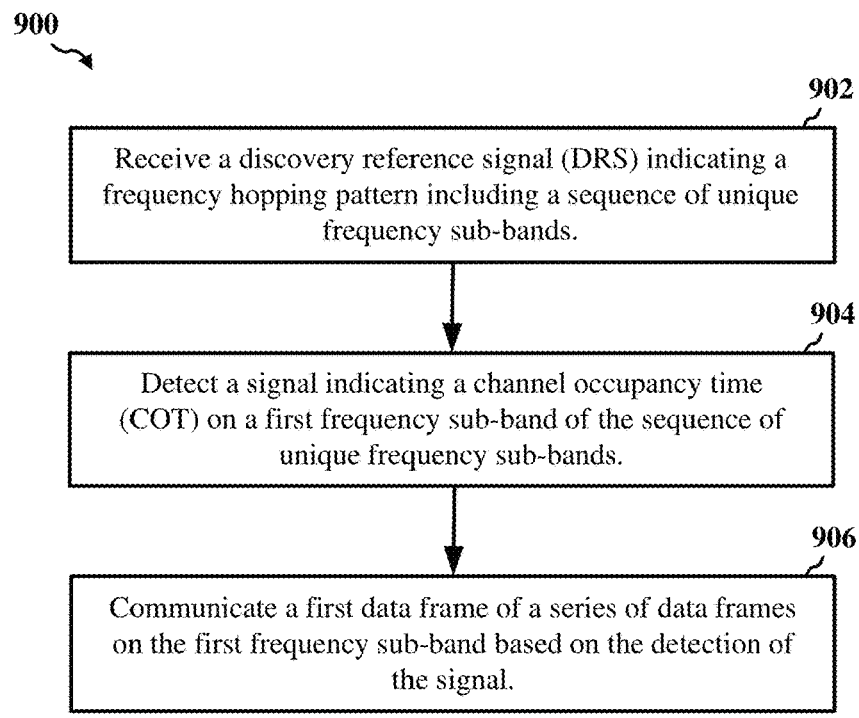
FIG. 9 shows a flowchart depicting an example operation for wireless communications that supports frequency hopping in narrowband communications.

FIG. 9 shows a flowchart depicting an example operation 900 for wireless communication that supports frequency hopping in narrowband communications. The operation 900 may be performed by an apparatus of a wireless communication device such as the UE 104 of FIG. 1, the UE 350 of FIG. 3, or the UE 404 of FIG. 4. At block 902, the UE receives a discovery reference signal (DRS) indicating a frequency hopping pattern including a sequence of unique frequency sub-bands. At block 904, the UE detects a signal indicating a channel occupancy time (COT) on a first frequency sub-band of the sequence of unique frequency sub-bands. At block 906, the UE communicates a first data frame of a series of data frames over the first frequency sub-band based on the detection of the signal.

In some implementations, the DRS in block 902 may be received over an anchor channel of an unlicensed frequency band. In some instances, the DRS in block 902 may include one or more clear channel assessment (CCA) parameters. In some other instances, the DRS also may include one or more of a primary synchronization signal (PSS), a secondary synchronization signal (SSS), a physical broadcast channel (PBCH), a system information block (SIB), a slot format indicator (SFI), or enhanced remaining minimum system information (eRMSI).

In some implementations, the received signal in block 904 may be one or more of a system information channel occupancy time (SI-COT), a group-common physical downlink control channel (GC-PDCCH), or a common transmit preamble. In some instances, a duration of the COT obtained by a base station may be based on one of a CCA procedure or an extended CCA procedure performed by the base station to gain access to the first frequency sub-band.

The CCA parameters in block 902 may indicate one or more of an initial slot position associated with transmissions over at least the first frequency sub-band or a maximum number of extended CCA procedures to be performed when gaining access to the first frequency sub-band. In some implementations, an initial slot position of the first data frame may be based on the number of CCA and extended CCA procedures performed to gain access to the first frequency sub-band, and an initial slot position of the DRS may be based on the number of CCA and extended CCA procedures performed to gain access to a channel over which the DRS is transmitted (such as an anchor channel of an unlicensed frequency band). In some instances, each data frame of the series of data frames may be preceded by a corresponding DRS and communicated over a corresponding frequency sub-band of the sequence of unique frequency sub-bands.

In some implementations, the DRS has a total dwell time on the anchor channel based on one or more of the 3GPP standards, the frequency hopping pattern includes at least 15 unique frequency sub-bands, and each of the at least 15 unique frequency sub-bands has a channel dwell time based on one or more of the 3GPP standards. In some instances, the anchor channel has a bandwidth of less than approximately 5 MHz, and the frequency sub-bands of the frequency hopping pattern have bandwidths greater than approximately 5 MHz. In some other instances, the anchor channel may have a bandwidth greater than 5 MHz, and the frequency sub-bands of the frequency hopping pattern may have bandwidths greater than 5 MHz.

Figure 10A:
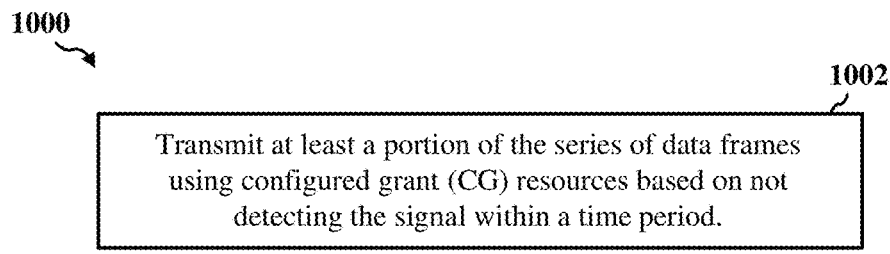
FIG. 10A shows a flowchart depicting an example operation for wireless communications that supports frequency hopping in narrowband communications.

FIG. 10A shows a flowchart depicting an example operation 1000 for wireless communication that supports frequency hopping in narrowband communications. The operation 1000 may be performed by an apparatus of a wireless communication device such as the UE 104 of FIG. 1, the UE 350 of FIG. 3, or the UE 404 of FIG. 4. In some implementations, the operation 1000 begins after the UE receives the DRS in block 902 of the operation 900 of FIG. 9. At block 1002, the UE transmits at least a portion of the series of data frames using configured grant (CG) resources based on not detecting the signal within a time period. For example, with reference also to FIG. 4, if the UE 404 does not receive or detect the COT indicator within a certain time period while camped on the first frequency sub-band, the UE 404 may transmit at least some of the UL data using CG resources. The UE 404 may then jump to the second frequency sub-band to detect a COT indicator on the second frequency sub-band.

Figure 10B:
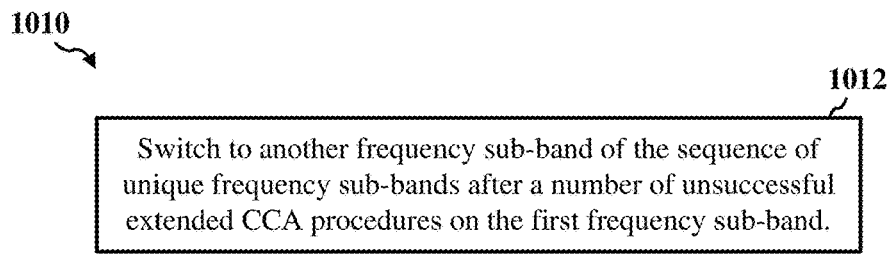
FIG. 10B shows a flowchart depicting an example operation for wireless communications that supports frequency hopping in narrowband communications.

FIG. 10B shows a flowchart depicting an example operation 1010 for wireless communication that supports frequency hopping in narrowband communications. The operation 1010 may be performed by an apparatus of a wireless communication device such as the UE 104 of FIG. 1, the UE 350 of FIG. 3, or the UE 404 of FIG. 4. In some implementations, the operation 1010 begins after the UE detects the COT indicator signal in block 904 of the operation 900 of FIG. 9. At block 1012, the UE switches to another frequency sub-band of the sequence of unique frequency sub-bands after a number of unsuccessful extended CCA procedures on the first frequency sub-band. For example, with reference also to FIG. 4, if the UE 404 fails to gain channel access to the first frequency sub-band after performing a number N of extended CCA procedures on the first frequency sub-band (where N is an integer greater than 1), the UE 404 may jump to the second frequency sub-band to detect a COT indicator on the second frequency sub-band.

Figure 10C:
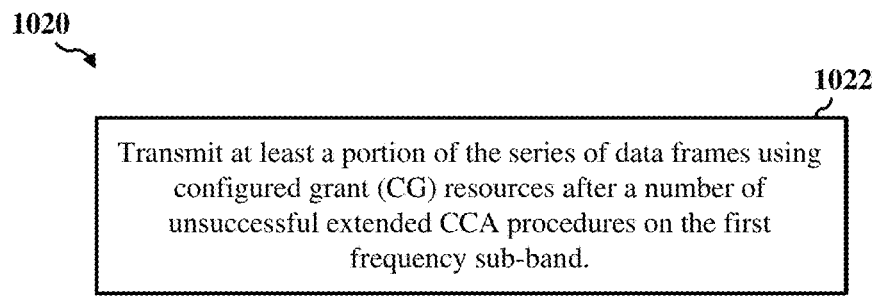
FIG. 10C shows a flowchart depicting an example operation for wireless communications that supports frequency hopping in narrowband communications.

FIG. 10C shows a flowchart depicting an example operation 1020 for wireless communications that supports frequency hopping in narrowband communications. The operation 1020 may be performed by an apparatus of a wireless communication device such as the UE 104 of FIG. 1, the UE 350 of FIG. 3, or the UE 404 of FIG. 4. In some implementations, the operation 1020 begins after the UE detects the COT indicator signal in block 904 of the operation 900 of FIG. 9. At block 1022, the UE transmits at least a portion of the series of data frames using configured grant (CG) resources after a number of unsuccessful extended CCA procedures on the first frequency sub-band. For example, with reference also to FIG. 4, if the UE 404 fails to gain channel access to the first frequency sub-band after performing a number N of extended CCA procedures on the first frequency sub-band (where N is an integer greater than 1), the UE 404 may transmit at least a portion of the UL data using CG resources.

Figure 10D:
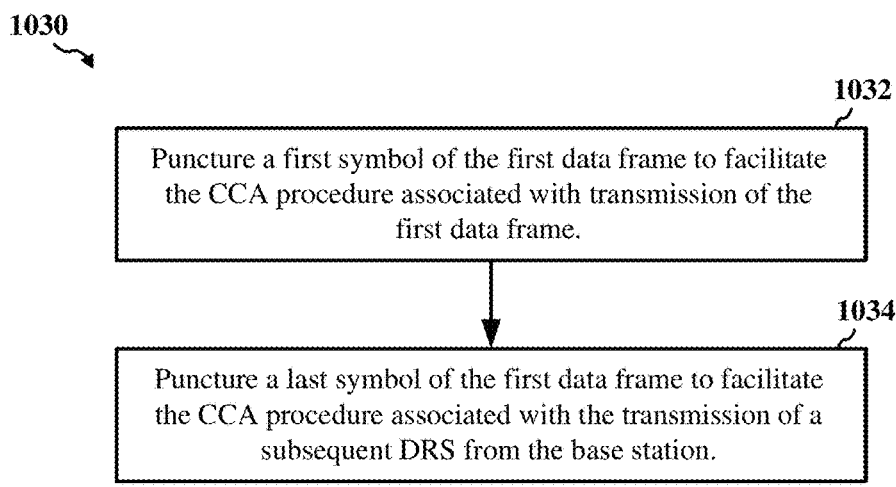
FIG. 10D shows a flowchart depicting an example operation for wireless communications that supports frequency hopping in narrowband communications.

FIG. 10D shows a flowchart depicting an example operation 1030 for wireless communications that supports frequency hopping in narrowband communications. The operation 1030 may be performed by an apparatus of a wireless communication device such as the UE 104 of FIG. 1, the UE 350 of FIG. 3, or the UE 404 of FIG. 4. In some implementations, the operation 1030 may be performed while the UE communicates the first data frame in block 906 of the operation 900 of FIG. 9. At block 1032, the UE punctures a first symbol of the first data frame to facilitate a CCA procedure associated with transmission of the first data frame to a base station over the first frequency sub-band. At block 1034, the UE punctures a last symbol of the first data frame to facilitate a CCA procedure associated with transmission of a subsequent DRS from the base station.

Figure 10E:
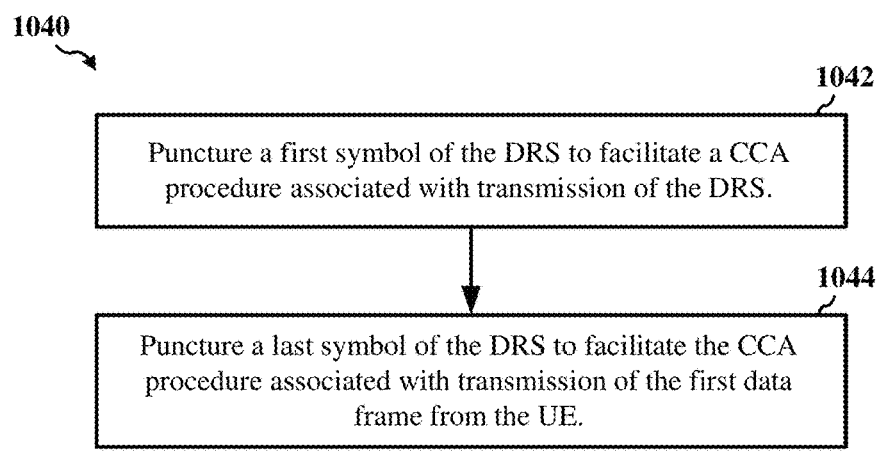
FIG. 10E shows a flowchart depicting an example operation for wireless communications that supports frequency hopping in narrowband communications.

FIG. 10E shows a flowchart depicting an example operation 1040 for wireless communications that supports frequency hopping in narrowband communications. The operation 1040 may be performed by an apparatus of a wireless communication device such as the base station 102 of FIG. 1, the UE 350 of FIG. 3, or the base station 402 of FIG. 4. At block 1042, the base station punctures a first symbol of the DRS to facilitate a CCA procedure associated with the transmission of the DRS. At block 1044, the base station punctures a last symbol of the DRS to facilitate a CCA procedure associated with the transmission of the first data frame from the UE.

Figure 11:
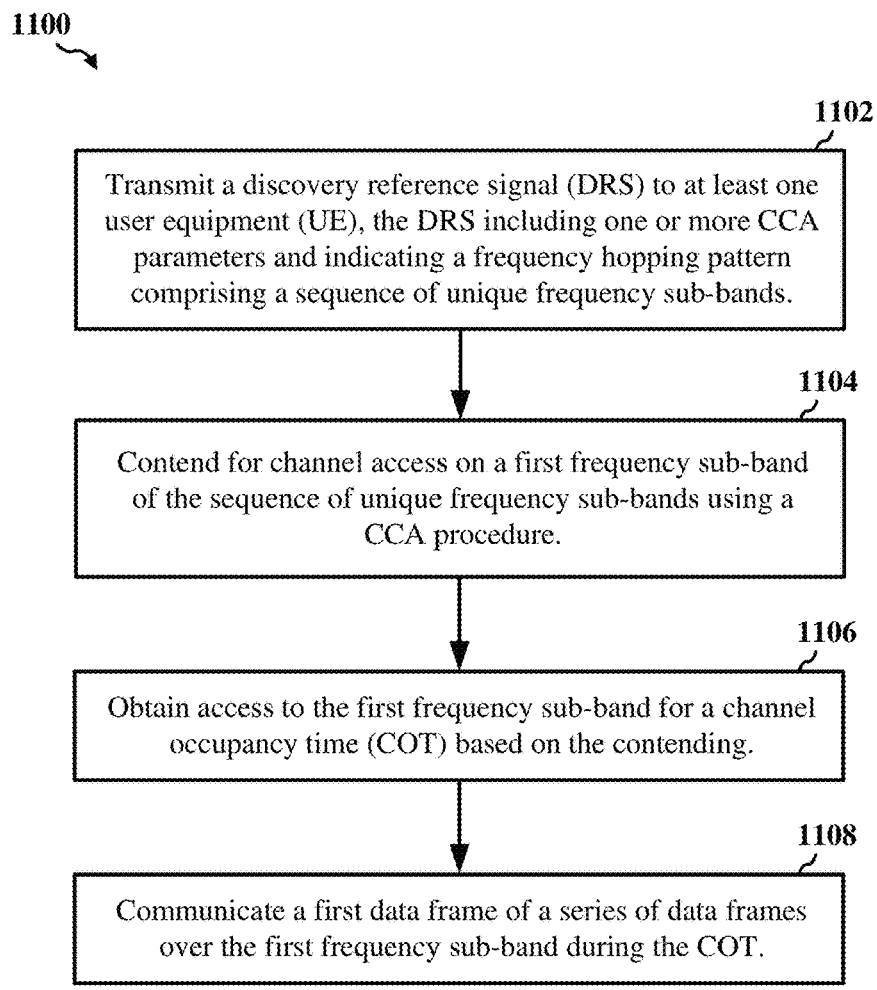
FIG. 11 shows a flowchart depicting an example operation for wireless communications that supports frequency hopping in narrowband communications.

FIG. 11 shows a flowchart depicting an example operation 1100 for wireless communication that supports frequency hopping in narrowband communications. The operation 1100 may be performed by an apparatus of a wireless communication device such as the base station 102 of FIG. 1, the base station 310 of FIG. 3, or the base station 402 of FIG. 4. At block 1102, the base station transmits a discovery reference signal (DRS) to at least one user equipment (UE), the DRS including one or more CCA parameters and indicating a frequency hopping pattern including a sequence of unique frequency sub-bands. At block 1104, the base station contends for channel access on a first frequency sub-band of the sequence of unique frequency sub-bands using a CCA procedure. At block 1106, the base station obtains access to the first frequency sub-band for a channel occupancy time (COT) based on the contending. At block 1108, the base station communicates a first data frame of a series of data frames over the first frequency sub-band during the COT.

In some implementations, the DRS may be transmitted over an anchor channel of an unlicensed frequency band. In some other implementations, the DRS may be transmitted over an anchor channel of a licensed frequency band (such as one or more licensed channels of a 5G RAN). In some instances, the DRS in block 1102 also may include one or more of a primary synchronization signal (PSS), a secondary synchronization signal (SSS), a physical broadcast channel (PBCH), a system information block (SIB), a slot format indicator (SFI), or enhanced remaining minimum system information (eRMSI). The CCA parameters in block 1102 may indicate one or more of an initial slot position associated with transmissions over at least the first frequency sub-band or a maximum number of extended CCA procedures to be performed when gaining access to the first frequency sub-band.

In some implementations, an initial slot position of the first data frame may be based on the number of CCA and extended CCA procedures performed to gain access to the first frequency sub-band, and an initial slot position of the DRS may be based on the number of CCA and extended CCA procedures performed to gain access to a channel over which the DRS is transmitted the anchor channel. In some implementations, each data frame of the sequence of data frames is preceded by a corresponding DRS and is communicated on a corresponding frequency sub-band of the sequence of unique frequency sub-bands.

In some implementations, the DRS has a total dwell time on the anchor channel based on one or more of the 3GPP standards, the frequency hopping pattern includes at least 15 unique frequency sub-bands, and each of the at least 15 unique frequency sub-bands has a channel dwell time based on one or more of the 3GPP standards. In some instances, the anchor channel has a bandwidth of less than approximately 5 MHz, and the frequency sub-bands of the frequency hopping pattern have bandwidths greater than approximately 5 MHz. In some other instances, the anchor channel may have a bandwidth greater than 5 MHz, and the frequency sub-bands of the frequency hopping pattern may have bandwidths greater than 5 MHz.

Figure 12:
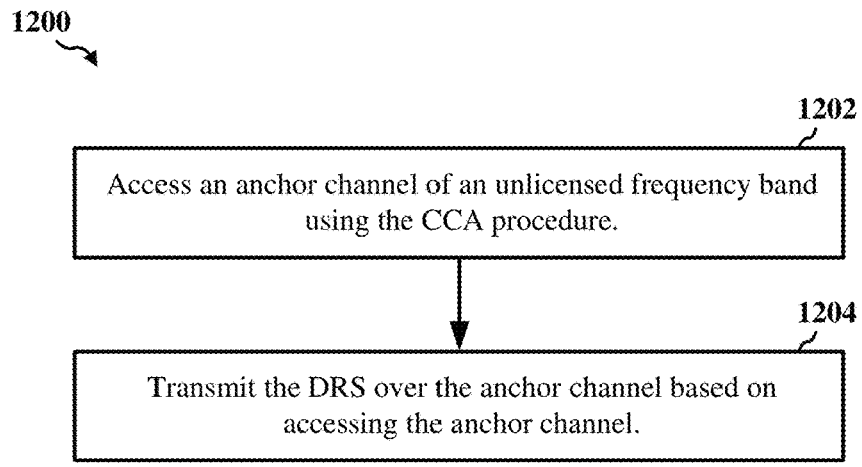
FIG. 12 shows a flowchart depicting an example operation for wireless communication that supports frequency hopping in narrowband communications.

FIG. 12 shows a flowchart depicting an example operation 1200 for wireless communication that supports frequency hopping in narrowband communications. The operation 1200 may be performed by an apparatus of a wireless communication device such as the base station 102 of FIG. 1, the base station 310 of FIG. 3, or the base station 402 of FIG. 4. In some implementations, the operation 1200 may be one example of the base station transmitting the DRS in block 1102 of the operation 1100 of FIG. 11. At block 1202, the base station accesses an anchor channel of an unlicensed frequency band using the CCA procedure. At block 1204, the base station transmits the DRS over the anchor channel based on accessing the anchor channel.

FIG. 13A shows a flowchart depicting an example operation 1300 for wireless communication that supports frequency hopping in narrowband communications. The operation 1300 may be performed by an apparatus of a wireless communication device such as the base station 102 of FIG. 1, the base station 310 of FIG. 3, or the base station 402 of FIG. 4. In some implementations, the operation 1300 begins after the base station communicates the first data frame in block 1108 of the operation 1100 of FIG. 11. At block 1302, the base station indicates the obtained COT on the first frequency sub-band by transmitting one or more of system information channel occupancy time (SI-COT), a group-common physical downlink control channel (GC-PDCCH), or a common transmit preamble to the at least one UE.

FIG. 13B shows a flowchart depicting an example operation 1310 for wireless communication that supports frequency hopping in narrowband communications. The operation 1310 may be performed by an apparatus of a wireless communication device such as the base station 102 of FIG. 1, the base station 310 of FIG. 3, or the base station 402 of FIG. 4. In some implementations, the operation 1310 begins after the base station contends for channel access using the CCA procedure in block 1104 of the operation 1100 of FIG. 11. At block 1312, the base station contends for channel access on the first frequency sub-band using an extended CCA procedure based on not gaining channel access using the CCA procedure. At block 1314, the base station obtains access to the first frequency sub-band based on the extended CCA procedure. At block 1316, the base station communicates the first data frame over the first frequency sub-band based on obtaining access to the first frequency sub-band.

FIG. 13C shows a flowchart depicting an example operation 1320 for wireless communication that supports frequency hopping in narrowband communications. The operation 1320 may be performed by an apparatus of a wireless communication device such as the base station 102 of FIG. 1, the base station 310 of FIG. 3, or the base station 402 of FIG. 4. In some implementations, the operation 1320 may be performed while the base station communicates the first data frame in block 1108 of the operation 1100 of FIG. 11. At block 1322, the base station times the communication of the first data frame to align with a slot boundary associated with the first frequency sub-band.

FIG. 13D shows a flowchart depicting an example operation 1330 for wireless communication that supports frequency hopping in narrowband communications. The operation 1330 may be performed by an apparatus of a wireless communication device such as the base station 102 of FIG. 1, the base station 310 of FIG. 3, or the base station 402 of FIG. 4. In some implementations, the operation 1330 may be performed after the base station contends for channel access using the extended CCA procedure in block 1312 of the operation 1310 of FIG. 13B. At block 1332, the base station switches to another frequency sub-band of the sequence of unique frequency sub-bands after a number of unsuccessful extended CCA procedures.

FIG. 13E shows a flowchart depicting an example operation 1340 for wireless communication that supports frequency hopping in narrowband communications. The operation 1340 may be performed by an apparatus of a wireless communication device such as the base station 102 of FIG. 1, the base station 310 of FIG. 3, or the base station 402 of FIG. 4. In some implementations, the operation 1340 begins after the base station communicates the first data frame in block 1108 of the operation 1100 of FIG. 11. At block 1342, the base station transmits remaining minimum system information (RMSI) on the first frequency sub-band.

Figure 14A:
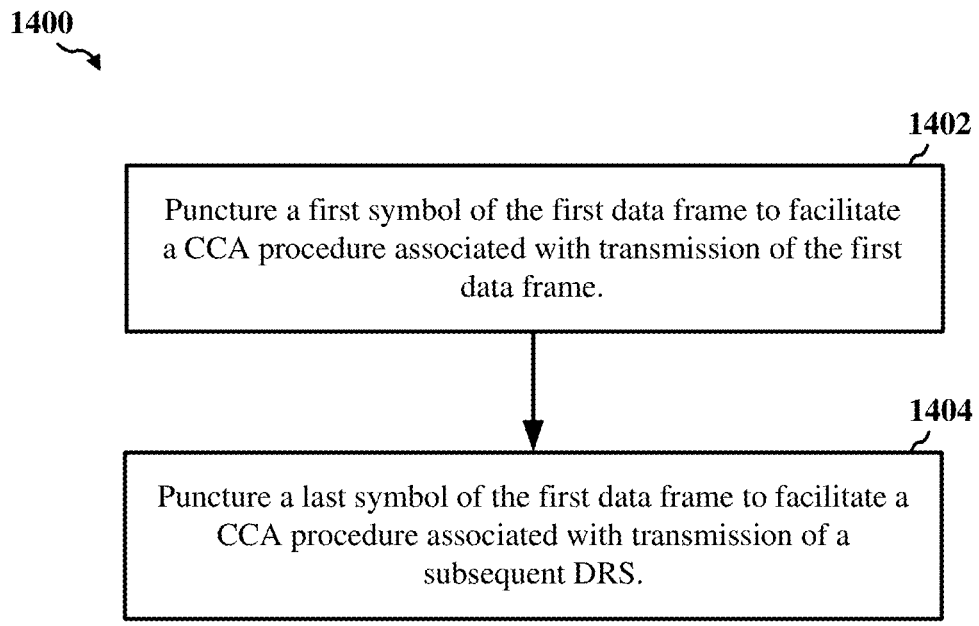
FIG. 14A shows a flowchart depicting an example operation for wireless communications that supports frequency hopping in narrowband communications.

FIG. 14A shows a flowchart depicting an example operation 1400 for wireless communication that supports frequency hopping in narrowband communications. The operation 1400 may be performed by an apparatus of a wireless communication device such as the base station 102 of FIG. 1, the base station 310 of FIG. 3, or the base station 402 of FIG. 4. In some implementations, the operation 1400 may be performed before or while the base station transmits the DRS in block 1102 of the operation 1100 of FIG. 11. At block 1402, the base station punctures a first symbol of the first data frame to facilitate a CCA procedure associated with transmission of the first data frame. At block 1404, the base station punctures a last symbol of the first data frame to facilitate a CCA procedure associated with transmission of a subsequent DRS.

Figure 14B:
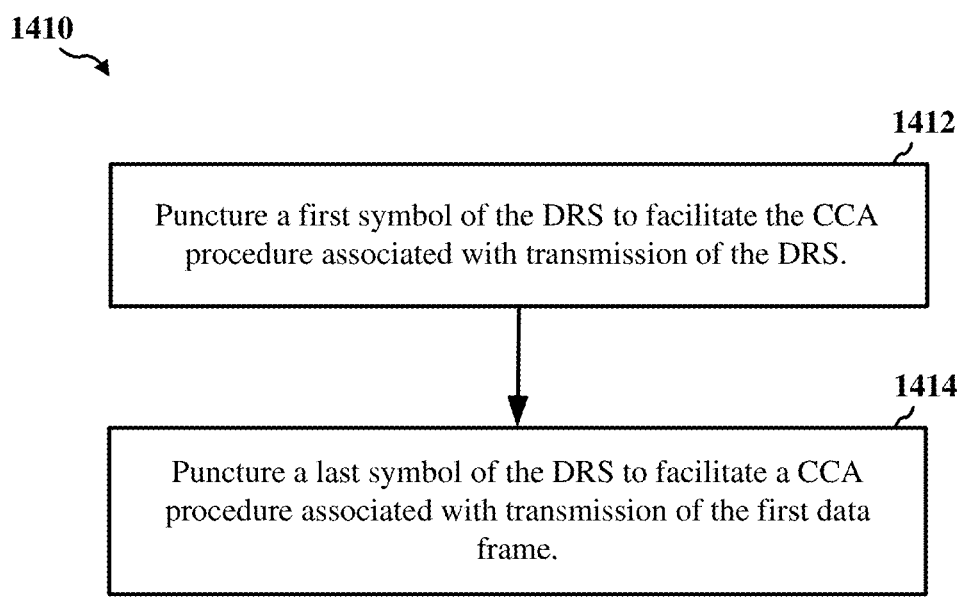
FIG. 14B shows a flowchart depicting an example operation for wireless communications that supports frequency hopping in narrowband communications.

FIG. 14B shows a flowchart depicting an example operation 1410 for wireless communication that supports frequency hopping in narrowband communications. The operation 1410 may be performed by an apparatus of a wireless communication device such as the base station 102 of FIG. 1, the base station 310 of FIG. 3, or the base station 402 of FIG. 4. In some implementations, the operation 1410 may be performed before or while the base station communicates the first data frame in block 1108 of the operation 1100 of FIG. 11. At block 1412, the base station punctures a first symbol of the DRS to facilitate the CCA procedure associated with transmission of the DRS. At block 1414, the base station punctures a last symbol of the DRS to facilitate a CCA procedure associated with transmission of the first data frame.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices (such as a combination of a DSP and a microprocessor), a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method performed by an apparatus of a user equipment (UE), comprising:
   receiving a discovery reference signal (DRS) indicating a frequency hopping pattern including a sequence of frequency sub-bands;
   receiving an indication of one or more clear channel assessment (CCA) parameters, the one or more CCA parameters indicating an initial slot position associated with transmissions over at least a first frequency sub-band of the sequence of frequency sub-bands, a maximum quantity of CCA procedures to be performed when gaining access to one or more respective frequency sub-bands of the sequence of frequency sub-bands, or both; and
   monitoring for a signal indicating a channel occupancy time (COT) on the first frequency sub-band of the sequence of frequency sub-bands based at least in part on the maximum quantity of CCA procedures to be performed.

2. The method of claim 1, wherein the DRS is received over an anchor channel of an unlicensed frequency band.

3. The method of claim 1, wherein a result of the monitoring is a failure to detect the signal indicating the COT within a time period associated with the maximum quantity of CCA procedures, the method further comprising:
   transmitting at least a portion of a series of data frames using configured grant (CG) resources based at least in part on the failure to detect the signal indicating the COT within the time period.

4. The method of claim 1, wherein the signal comprises one or more of a system information channel occupancy time (SI-COT), a group-common physical downlink control channel (GC-PDCCH), or a common transmit preamble.

5. The method of claim 1, wherein monitoring for the signal indicating the COT is based at least in part on one of a CCA procedure or an extended CCA procedure performed on the first frequency sub-band.

6. The method of claim 1, wherein an initial slot position of the DRS is based on a quantity of CCA and extended CCA procedures performed to gain access to a channel over which the DRS is received, and wherein an initial slot position of a first data frame is based on the quantity of CCA and extended CCA procedures performed to gain access to the first frequency sub-band.

7. The method of claim 1, further comprising:
   switching to another frequency sub-band of the sequence of frequency sub-bands after a quantity of unsuccessful CCA procedures are performed on the first frequency sub-band, the quantity of unsuccessful CCA procedures based at least in part on the maximum quantity of CCA procedures to be performed; or
   transmitting at least a portion of a series of data frames using configured grant (CG) resources after the quantity of unsuccessful extended CCA procedures on the first frequency sub-band, the quantity of unsuccessful CCA procedures based at least in part on the maximum quantity of CCA procedures to be performed.

8. The method of claim 7, wherein each data frame of the series of data frames is preceded by a corresponding DRS and is communicated over a respective frequency sub-band of the sequence of frequency sub-bands.

9. The method of claim 1, wherein the DRS includes a slot format indicator (SFI) and includes enhanced remaining minimum system information (eRMSI) indicating the frequency hopping pattern and each of the frequency sub-bands.

10. The method of claim 1, wherein:
    a first symbol of the DRS is punctured to facilitate a clear channel assessment (CCA) procedure associated with transmission of the DRS; or
    a last symbol of the DRS is punctured to facilitate a CCA procedure associated with transmission of a first data frame from the UE.

11. The method of claim 1, further comprising at least one of:
    puncturing a first symbol of a first data frame of a series of data frames to facilitate a clear channel assessment (CCA) procedure associated with transmission of the first data frame; or
    puncturing a last symbol of the first data frame to facilitate a CCA procedure associated with transmission of a subsequent DRS from an access network node.

12. A wireless communication device, comprising:
    an interface configured to:
       obtain a discovery reference signal (DRS) indicating a frequency hopping pattern including a sequence of frequency sub-bands; and
       obtain an indication of one or more clear channel assessment (CCA) parameters, the one or more CCA parameters indicating an initial slot position associated with transmissions over at least a first frequency sub-band of the sequence of frequency sub-bands, a maximum quantity of CCA procedures to be performed when gaining access to one or more respective frequency sub-bands of the sequence of frequency sub-bands, or both; and
    a processing system configured to:
       monitor for a signal indicating a channel occupancy time (COT) on the first frequency sub-band of the sequence of frequency sub-bands based at least in part on the maximum quantity of CCA procedures to be performed.

13. The wireless communication device of claim 12, wherein the DRS is received over an anchor channel of an unlicensed frequency band, and the signal comprises one or more of a system information channel occupancy time (SICOT), a group-common physical downlink control channel (GC-PDCCH), or a common transmit preamble.

14. The wireless communication device of claim 12, wherein monitoring for the signal indicating the COT is based on one of a CCA procedure or an extended CCA procedure performed on the first frequency sub-band.

15. The wireless communication device of claim 12, wherein the interface is further configured to:
    switch to another frequency sub-band of the sequence of frequency sub-bands after a quantity of unsuccessful CCA procedures are performed on the first frequency sub-band, the quantity of unsuccessful CCA procedures based at least in part on the maximum quantity of CCA procedures to be performed; or
    output at least a portion of a series of data frames for transmission using configured grant (CG) resources after the quantity of unsuccessful extended CCA procedures are performed on the first frequency sub-band, the quantity of unsuccessful CCA procedures based at least in part on the maximum quantity of CCA procedures to be performed.

16. A method performed by an apparatus of an access network node, comprising:

transmitting a discovery reference signal (DRS) to at least one user equipment (UE), the DRS including an indication of one or more clear channel assessment (CCA) parameters and indicating a frequency hopping pattern including a sequence of frequency sub-bands, the one or more CCA parameters indicating an initial slot position associated with transmissions over at least a first a first frequency sub-band of the sequence of frequency sub-bands, a maximum quantity of CCA procedures to be performed when gaining access to one or more respective frequency sub-bands of the sequence of frequency sub-bands, or both; and contending for channel access on a first frequency sub-band of the sequence of frequency sub-bands using a CCA procedure and based at least in part on the maximum quantity of CCA procedures to be performed.

17. The method of claim 16, wherein transmitting the DRS comprises:
accessing an anchor channel of an unlicensed frequency band using the CCA procedure; and
transmitting the DRS over the anchor channel based on accessing the anchor channel.

18. The method of claim 16, further comprising:
indicating a channel occupancy time (COT) obtained on the first frequency sub-band by transmitting one or more of system information channel occupancy time (SI-COT), a group-common physical downlink control channel (GC-PDCCH), or a common transmit preamble to the at least one UE.

19. The method of claim 16, further comprising:
performing one or more unsuccessful CCA procedures comprising the CCA procedure within a time period that is associated with the maximum quantity of CCA procedures; and
receiving at least a portion of a series of data frames using configured grant (CG) resources based at least in part on performing the one or more unsuccessful CCA procedures within the time period, each data frame of the series of data frames being preceded by a corresponding DRS and is communicated over a corresponding frequency sub-band of the sequence of frequency sub-bands.

20. The method of claim 16, further comprising:
contending for channel access on the first frequency sub-band using an extended CCA procedure based at least in part on not gaining channel access using the CCA procedure;
obtaining access to the first frequency sub-band based at least in part on the extended CCA procedure; and
communicating a first data frame of a series of data frames over the first frequency sub-band based on at least in part obtaining access to the first frequency sub-band.

21. The method of claim 20, further comprising:
switching to another frequency sub-band of the sequence of frequency sub-bands after a quantity of unsuccessful CCA procedures, the quantity of unsuccessful CCA procedures based at least in part on the maximum quantity of CCA procedures to be performed.

22. The method of claim 16, wherein the DRS includes enhanced remaining minimum system information (eRMSI) indicating the frequency hopping pattern and each of the frequency sub-bands.

23. The method of claim 16, further comprising at least one of:

puncturing a first symbol of a first data frame of a series of data frames to facilitate a CCA procedure associated with transmission of the first data frame; or
puncturing a last symbol of the first data frame to facilitate a CCA procedure associated with transmission of a subsequent DRS.

24. The method of claim 16, further comprising at least one of:
puncturing a first symbol of the DRS to facilitate the CCA procedure associated with transmission of the DRS; or
puncturing a last symbol of the DRS to facilitate a CCA procedure associated with transmission of a first data frame of a series of data frames.

25. A wireless communication device, comprising:
a memory;
at least one network interface; and
a processing system communicatively coupled to the memory and the at least one network interface, wherein the processing system is configured to:
transmit a discovery reference signal (DRS) to at least one user equipment (UE), the DRS including an indication of one or more clear channel assessment (CCA) parameters and indicating a frequency hopping pattern including a sequence of frequency sub-bands, the one or more CCA parameters indicating an initial slot position associated with transmissions over at least a first frequency sub-band of the sequence of frequency sub-bands, a maximum quantity of CCA procedures to be performed when gaining access to one or more respective frequency sub-bands of the sequence of frequency sub-bands, or both; and
contend for channel access on a first frequency sub-band of the sequence of frequency sub-bands using a CCA procedure and based at least in part on the maximum quantity of CCA procedures to be performed.

26. The wireless communication device of claim 25, wherein the processing system is further configured to:
indicate a channel occupancy time (COT) obtained on the first frequency sub-band by transmitting one or more of system information channel occupancy time (SI-COT), a group-common physical downlink control channel (GC-PDCCH), or a common transmit preamble to the at least one UE.

27. The wireless communication device of claim 25, wherein the processing system is further configured to:
contend for channel access on the first frequency sub-band using an extended CCA procedure based at least in part on not gaining channel access using the CCA procedure;
obtain access to the first frequency sub-band based at least in part on the extended CCA procedure; and
communicate a first data frame of a series of data frames over the first frequency sub-band based at least in part on obtaining access to the first frequency sub-band.

28. The wireless communication device of claim 27, wherein the processing system is further configured to:
switch to another frequency sub-band of the sequence of frequency sub-bands after a quantity of unsuccessful CCA procedures, the quantity of unsuccessful CCA procedures based at least in part on the maximum quantity of CCA procedures to be performed.

* * * * *